United States Patent
Li et al.

(10) Patent No.: US 8,292,183 B2
(45) Date of Patent: Oct. 23, 2012

(54) INDICIA READING TERMINAL HAVING MULTIPLE SETTING IMAGING LENS

(75) Inventors: Jianhua Li, Fremont, CA (US); Ynjiun P. Wang, Cupertino, CA (US); Chen Feng, Snohomish, WA (US); William H. Havens, Syracuse, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 13/079,542

(22) Filed: Apr. 4, 2011

(65) Prior Publication Data

US 2011/0174880 A1 Jul. 21, 2011

Related U.S. Application Data

(62) Division of application No. 12/132,480, filed on Jun. 3, 2008, now Pat. No. 7,918,398.

(60) Provisional application No. 60/933,022, filed on Jun. 4, 2007.

(51) Int. Cl.
*G06K 7/10* (2006.01)
*G06K 15/12* (2006.01)

(52) U.S. Cl. .......... 235/462.41; 235/462.24; 235/462.11

(58) Field of Classification Search ............ 235/462.41, 235/462.11, 462.24, 472.01
See application file for complete search history.

(56) References Cited

U.S. PATENT DOCUMENTS

| | | | |
|---|---|---|---|
| 4,877,949 A | 10/1989 | Danielson et al. | |
| 5,019,699 A | 5/1991 | Koenck | |
| 5,406,062 A | 4/1995 | Hasegawa et al. | |
| 5,572,006 A | 11/1996 | Wang et al. | |
| 5,576,529 A | 11/1996 | Koenck et al. | |
| 5,591,955 A | 1/1997 | Laser | |
| 5,646,390 A | 7/1997 | Wang et al. | |
| 5,702,058 A | 12/1997 | Dobbs et al. | |
| 5,756,981 A | 5/1998 | Roustaei et al. | |
| 5,770,847 A | 6/1998 | Olmstead | |
| 5,784,102 A | 7/1998 | Hussey et al. | |
| 5,786,582 A | 7/1998 | Roustaei et al. | |
| 5,811,828 A | 9/1998 | Laser | |
| 5,815,200 A | 9/1998 | Ju et al. | |
| 5,821,518 A | 10/1998 | Sussmeier et al. | |
| 5,837,987 A | 11/1998 | Koenck et al. | |
| 5,841,121 A | 11/1998 | Koenck | |

(Continued)

FOREIGN PATENT DOCUMENTS

CN 101031930 A 9/2007

(Continued)

OTHER PUBLICATIONS

Extended European Search Report for European Patent Application No. 08010217, Dated Oct. 17, 2008, 3 pages cited by other.

(Continued)

*Primary Examiner* — Edwyn Labaze
(74) *Attorney, Agent, or Firm* — Heslin Rothenberg Farley & Mesiti P.C.

(57) ABSTRACT

An indicia reading terminal can include a multiple setting imaging lens assembly and an image sensor having an image sensor array. In one embodiment, an indicia reading terminal in an active reading state can cycle through a set of different lens settings, expose pixels of an image sensor array during an exposure period when each new lens setting is achieved, and attempt to decode decodable indicia represented in frames of image data captured corresponding to each exposure period. In one embodiment, movement of an imaging lens assembly lens element can be provided with use of a hollow stepper motor.

20 Claims, 10 Drawing Sheets

U.S. PATENT DOCUMENTS

| | | | |
|---|---|---|---|
| 6,010,070 A | 1/2000 | Mizuochi et al. |
| 6,073,851 A | 6/2000 | Olmstead et al. |
| 6,223,988 B1 | 5/2001 | Batterman et al. |
| 6,230,975 B1 | 5/2001 | Colley et al. |
| 6,254,003 B1 | 7/2001 | Pettinelli et al. |
| 6,315,203 B1 | 11/2001 | Ikeda et al. |
| 6,386,452 B1 | 5/2002 | Kawamura |
| 6,522,441 B1 | 2/2003 | Rudeen |
| 6,598,797 B2 | 7/2003 | Lee |
| 6,601,768 B2 | 8/2003 | McCall et al. |
| 6,681,994 B1 | 1/2004 | Koenck |
| 6,695,209 B1 | 2/2004 | La |
| 6,832,725 B2 | 12/2004 | Gardiner et al. |
| 6,880,759 B2 | 4/2005 | Wilde et al. |
| 7,044,378 B2 | 5/2006 | Patel et al. |
| 7,055,747 B2 | 6/2006 | Havens et al. |
| 7,073,715 B2 | 7/2006 | Patel et al. |
| 7,083,098 B2 | 8/2006 | Joseph et al. |
| 7,148,923 B2 | 12/2006 | Harper et al. |
| 7,270,274 B2 | 9/2007 | Hennick et al. |
| 7,287,696 B2 | 10/2007 | Attia et al. |
| 7,303,126 B2 | 12/2007 | Patel et al. |
| 7,382,911 B1 | 6/2008 | Meier et al. |
| 7,533,824 B2 | 5/2009 | Hennick et al. |
| 7,568,628 B2 | 8/2009 | Wang et al. |
| 7,611,060 B2 | 11/2009 | Wang et al. |
| 7,717,343 B2 | 5/2010 | Havens et al. |
| 7,813,047 B2 | 10/2010 | Wang et al. |
| 7,878,403 B2 | 2/2011 | Hennick et al. |
| 7,909,257 B2 | 3/2011 | Wang et al. |
| 7,918,398 B2 | 4/2011 | Li et al. |
| 7,946,493 B2 | 5/2011 | Havens et al. |
| 8,027,095 B2 | 9/2011 | Havens |
| 8,027,096 B2 | 9/2011 | Feng et al. |
| 8,038,066 B2 | 10/2011 | Havens et al. |
| 2001/0003346 A1 | 6/2001 | Feng |
| 2002/0125322 A1 | 9/2002 | McCall et al. |
| 2003/0019934 A1 | 1/2003 | Hunter et al. |
| 2003/0029917 A1 | 2/2003 | Hennick et al. |
| 2003/0034394 A1 | 2/2003 | Gannon et al. |
| 2003/0062413 A1 | 4/2003 | Gardiner et al. |
| 2003/0089776 A1 | 5/2003 | Hennick et al. |
| 2003/0213847 A1 | 11/2003 | McCall et al. |
| 2004/0206825 A1 | 10/2004 | Schmidt et al. |
| 2005/0001035 A1 | 1/2005 | Hawley et al. |
| 2005/0103854 A1 | 5/2005 | Zhu et al. |
| 2006/0011724 A1 | 1/2006 | Joseph et al. |
| 2006/0043194 A1 | 3/2006 | Barkan et al. |
| 2006/0113386 A1 | 6/2006 | Olmstead |
| 2006/0119738 A1 | 6/2006 | Kido |
| 2006/0163355 A1 | 7/2006 | Olmstead et al. |
| 2006/0202036 A1 | 9/2006 | Wang et al. |
| 2006/0202038 A1 | 9/2006 | Wang et al. |
| 2006/0249581 A1 | 11/2006 | Smith |
| 2007/0040034 A1 | 2/2007 | Hennick et al. |
| 2007/0063048 A1 | 3/2007 | Havens et al. |
| 2007/0080280 A1 | 4/2007 | Havens |
| 2007/0156021 A1 | 7/2007 | Morse et al. |
| 2007/0158428 A1 | 7/2007 | Havens et al. |
| 2007/0181692 A1 | 8/2007 | Barkan et al. |
| 2008/0144185 A1 | 6/2008 | Wang et al. |
| 2008/0144186 A1 | 6/2008 | Feng et al. |
| 2008/0223933 A1 | 9/2008 | Smith |
| 2008/0223934 A1 | 9/2008 | Havens et al. |
| 2008/0265034 A1 | 10/2008 | Gibson |
| 2009/0072038 A1 | 3/2009 | Li et al. |
| 2009/0088203 A1 | 4/2009 | Havens et al. |
| 2009/0108071 A1 | 4/2009 | Carlson |
| 2009/0236424 A1 | 9/2009 | Hennick et al. |
| 2010/0044440 A1 | 2/2010 | Wang et al. |
| 2010/0090007 A1 | 4/2010 | Wang et al. |
| 2010/0225757 A1 | 9/2010 | Li et al. |
| 2010/0276490 A1 | 11/2010 | Havens et al. |
| 2010/0276491 A1 | 11/2010 | Havens et al. |
| 2010/0276492 A1 | 11/2010 | Wang et al. |
| 2010/0276493 A1 | 11/2010 | Havens et al. |
| 2011/0017829 A1 | 1/2011 | Wang et al. |
| 2011/0036908 A1 | 2/2011 | Havens et al. |
| 2011/0036911 A1 | 2/2011 | Havens et al. |
| 2011/0089245 A1 | 4/2011 | Wang et al. |
| 2011/0121076 A1 | 5/2011 | Hennick et al. |
| 2011/0163166 A1 | 7/2011 | Wang et al. |
| 2011/0174880 A1 | 7/2011 | Li et al. |
| 2011/0212751 A1 | 9/2011 | Havens et al. |

FOREIGN PATENT DOCUMENTS

| | | | |
|---|---|---|---|
| CN | 101147157 A | 3/2008 |
| EP | 1784761 A1 | 5/2007 |
| EP | 1828957 A2 | 9/2007 |
| EP | 1856651 A2 | 11/2007 |
| JP | 2008511917 T | 4/2008 |
| WO | WO-2006026141 A1 | 3/2006 |
| WO | WO-2006065450 A2 | 6/2006 |
| WO | WO-2006081466 A2 | 8/2006 |
| WO | WO-2006098955 A2 | 9/2006 |

OTHER PUBLICATIONS

Extended European Search Report for European Patent Application No. 08010217, Dated Oct. 17, 2008, 3 pages.

U.S. Appl. No. 12/132,462, filed with the United States Patent and Trademark Office Jun. 3, 2008.

8,047,439, 10/2011, Havens et al. (withdrawn).

INDICIA READING TERMINAL HAVING MULTIPLE SETTING IMAGING LENS

CROSS REFERENCE TO RELATED APPLICATIONS

This application is a divisional of U.S. patent application Ser. No. 12/132,480, filed Jun. 3, 2008 entitled "Indicia Reading Terminal Having Multiple Setting Imaging Lens," which claims priority under 35 U.S.C. §119(e) to Provisional Patent Application No. 60/933,022, entitled "Indicia Reading Terminal Processing Plurality of Frames of Image Data Responsively To Trigger Signal Activation" filed Jun. 4, 2007. Application Ser. No. 12/132,480 is related to U.S. patent application Ser. No. 12/132,462, filed Jun. 3, 2008 entitled "Indicia Reading Terminal Processing Plurality of Frames Of Image Data Responsively to Trigger Signal Activation." Each of the above applications is incorporated herein by reference in its entirety.

FIELD OF THE INVENTION

The invention relates to an indicia reading terminal in general, and specifically, to an indicia reading terminal having a multiple setting imaging lens assembly.

BACKGROUND OF THE PRIOR ART

A majority of commercially available image based indicia reading terminals are equipped with fixed position (single setting) imaging lens assemblies. Advances in lens technology, illumination technology, image sensor technology, and image processing technology have increased the depth of field of such terminals. However, the operational field of view of such terminals is limited by the single setting aspect of the lens assemblies of such terminals.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
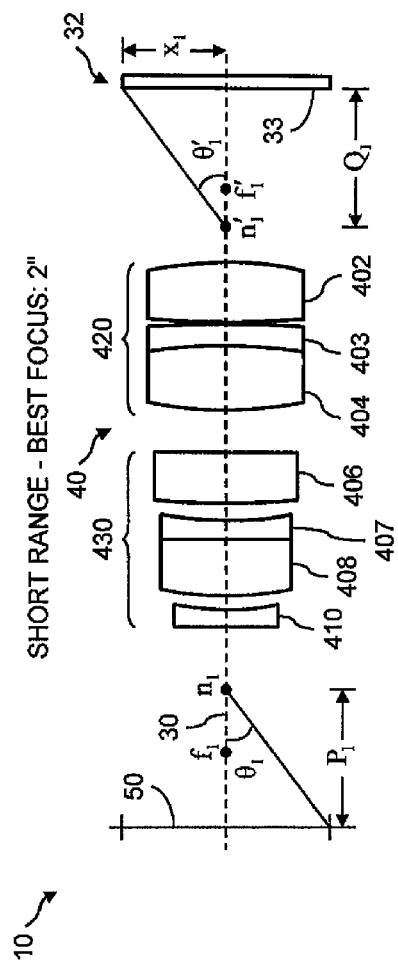
FIG. 1 is a schematic diagram illustrating an indicia reading terminal having a multiple setting imaging lens assembly, wherein the imaging lens assembly has a plurality of lens elements, and wherein the imaging lens assembly is set to a first setting.
Figure 2:
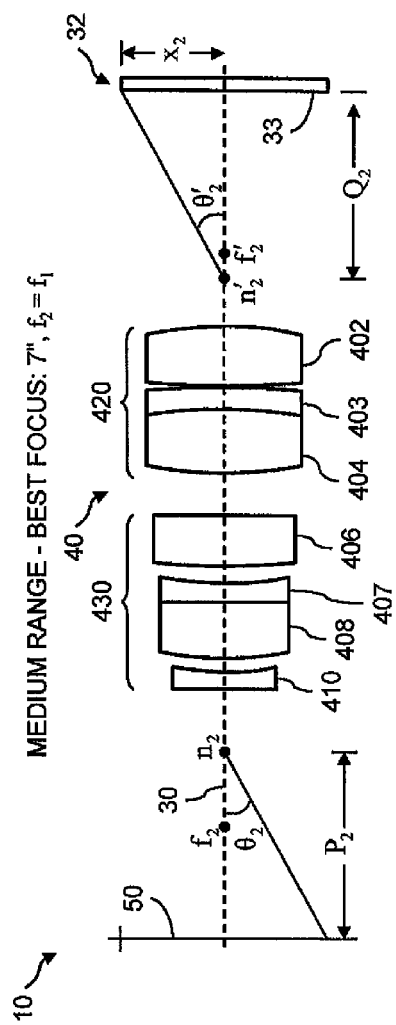
FIG. 2 is a schematic diagram illustrating an indicia reading terminal having a multiple setting imaging lens assembly, wherein the imaging lens assembly has a plurality of lens elements, and wherein the imaging lens assembly is set to a second setting.
Figure 3:
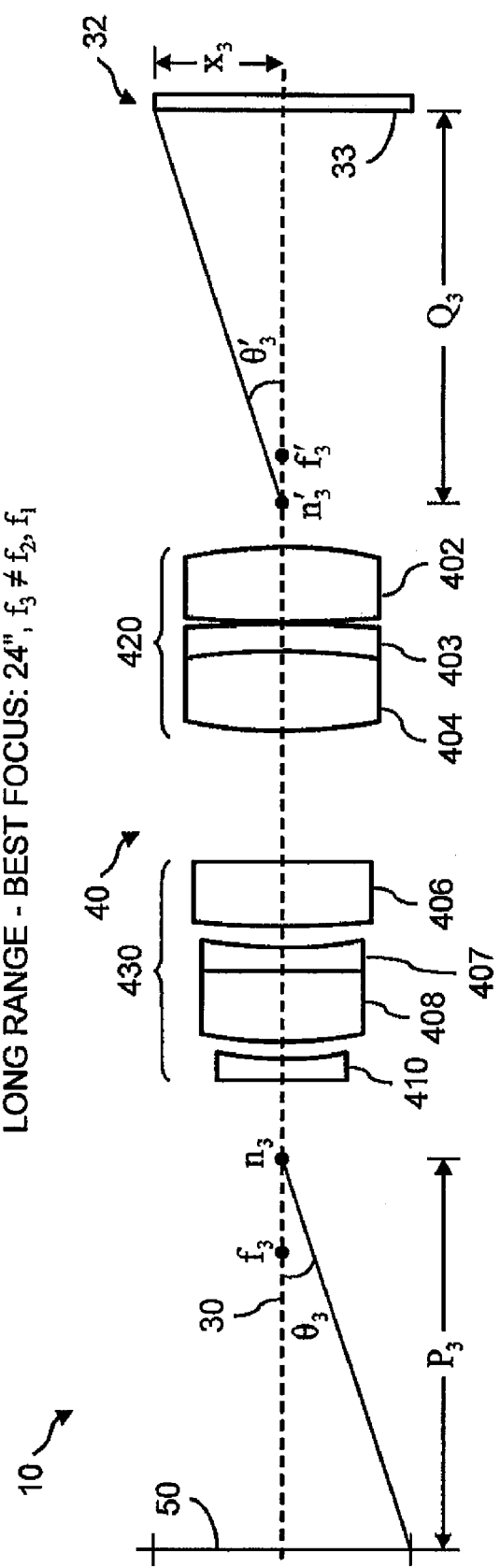
FIG. 3 is a schematic diagram illustrating an indicia reading terminal having a multiple setting imaging lens assembly, wherein the imaging lens assembly has a plurality of lens elements, and wherein the imaging lens assembly is set to a third setting.

There is provided an indicia reading terminal having a multiple setting imaging lens assembly (imaging lens). As shown in FIGS. 1, 2, and 3, terminal 10 can have an image sensor 32 and an imaging lens assembly 40 (imaging lens) capable of multiple lens settings. A multiple setting imaging lens assembly can be provided e.g., with use of one or more lens elements capable of being moved into different multiple positions, with use of one or more lens elements having adjustable lens surface curvatures, with use of one or more lens elements having an adjustable index of refraction, or with use of any combination of the above. In the particular embodiment of FIGS. 1, 2, and 3, a multiple lens setting indicia reading terminal comprises one or more multiple position lens elements. In the specific embodiment of FIGS. 1, 2, and 3, imaging lens assembly 40 comprises seven lens elements; namely, elements 402, 403, 404, 406, 407, 408, 410 where the combination of elements 403 and 404 and the combination of lens elements 407 and 408 are lens doublets. In the embodiment of FIGS. 1, 2, and 3, imaging lens assembly 40 focuses an image of a decodable indicia disposed on a target substrate 50 onto an active surface of image sensor 32. In one embodiment, an active surface of an image sensor can be provided by an image sensor pixel array 33 (image sensor array).

A well-corrected lens assembly can be treated as a "black box" whose characteristics are defined by its cardinal points; namely, its first and second focal points, its first and second principal points, and its first and second nodal points. The first focal point is the point at which light rays (for example, coming from the left) from an infinitely distant object and parallel to the optical axis are brought to a common focus on the optical axis. If the rays entering the lens assembly and those emerging from the lens assembly are extended until they intersect, the points of intersection will define a surface, usually referred to as the principal plane. The intersection of this surface with the optical axis is the principal point. The "second" focal point and the "second" principal plane are those defined by rays approaching the system from the right. The "first" points are those defined by rays from the left.

The focal length of a lens assembly (also referred to as the effective focal length, EFL) is the distance from the principal point to the focal point. The back focal length (BFL) or the back focus is the distance from the vertex of the last surface of the system to the second focal point (again for light traveling through the lens assembly from left to right). The front focal length (FFL) is the distance from the front surface to the first focal point. The nodal points are two axial points such that a ray directed at the first nodal point appears (after passing through the system) to emerge from the second nodal point parallel to its original direction. When a lens assembly is bounded on both sides by air (as is true in the great majority of applications), the nodal points coincide with the principal points.

FIGS. 1, 2 and 3 all show the respective effective focal points, nodal points, and field angles in both image and object space. Note that since the lens assembly is bounded on both sides by air, the nodal points coincide with the principal points. The field of view half angle is defined by the ray which originates at the most extreme field point of object 50 that projects to the point farthest removed from the optical axis of image sensor 32. The focal point, nodal point and field of view angles in object space are noted as $f_n$, $n_n$ and $\theta_n$ and the corresponding points in object space are noted as $f_n'$, $n_n'$, and $\theta_n'$. The subscript "n" represents the example associated with FIGS. 1, 2, and 3 respectively.

In general, using paraxial approximations, the distance from the lens object space nodal point to the object $P_n$, the distance from the image space nodal point to the image $Q_n$, and the focal length $f_n$ are related through the lens equation:

$$1/f_n = 1/P_n + 1/Q_n \qquad \text{eq. 1}$$

As the lens equation demonstrates, when the focal length is constant, the plane of nominal focus for the lens assembly can be changed simply by changing the separation between the object and the lens principal plane. If the focal length and image distance are similar in value, which is often the case in bar code imaging systems, then the image distance change will be minimal for a major shift in the object plane. The field of view for such lens assembly is determined by the size of the active surface of the image sensor. Similarly using paraxial approximations, the field angles for image space and object space are identical, thus:

$$\theta_n' = \theta_n$$

Referring again to FIGS. 1, 2, and 3, the half field of view angle $\theta_n'$ is related to the optical configuration:

$$\tan(\theta_n') = X_n/Q_n \qquad \text{eq. 2}$$

This can be substituted into the lens equation to eliminate $Q_n$ and giving:

$$\tan(\theta_n) = X_n * (1/f_n - 1/P_n) \qquad \text{eq. 3}$$

From this expression we can observe that the field of view for a lens assembly will not change strongly with object distance $P_n$ as long as the object distance is significantly larger than the lens focal length $f_n$. In bar code/indicia reading systems, this condition is usually satisfied. Conversely, if one wants to change the field of view, this can be most effectively done by changing the focal length $f_n$. In general, one can assert that if the lens curvatures, materials dimensions, and lens separations relative to each are unchanged, then the focal length of the lens assembly will be unchanged. Similarly, the focal length can be changed by varying any of these attributes either singularly or more likely together.

Where a focal length of an imaging lens assembly remains constant, a best focus distance of terminal 10 (the distance between the terminal and a substrate at which the terminal is optimally focused) can be adjusted by changing the distance between a focal point of imaging lens assembly 40 and the image plane, i.e., image sensor array 33 (the active surface of image sensor 32). A focal length of imaging lens assembly 40 can be maintained at a constant value by maintaining the relative positions of lens elements 402, 403, 404, 406, 407, 408, 410. A field of view (FOV) angle of an imaging lens assembly 40 is a function of an imaging lens assembly's focal length (the FOV angle of a lens is typically expressed in terms of "half FOV" units) and image plane distance. Where image plane distances are significantly larger than an imaging lens assembly's focal length, an FOV angle of imaging lens assembly 40 can be maintained at a substantially constant value by retaining the relative positions between lens elements. A focal length of an imaging lens assembly 40 can be changed by adjusting a relative position between lens elements of an imaging lens assembly having multiple lens elements. Thus, changing a relative position between lens grouping 420 and grouping 430 changes a focal length of imaging lens assembly 40. As mentioned, an FOV angle of imaging lens assembly 40 is a function of the imaging lens assembly's focal length. Accordingly, an FOV angle of imaging lens assembly 40 will change as grouping 420 is moved relative to grouping 430 or vice versa. Because the distance between a focal point position and image sensor 32 (the image plane) will also change as one grouping is moved relative to another, a change in the relative position between grouping 420 and grouping 430 can be expected to produce a change in a best focus position of terminal 10 as well as a change in the focal length and field of view angle. The act of reducing a field of view angle of a lens while increasing a best focus distance is often referred to as "zooming." Where an imaging lens assembly is capable of zooming, it is often referred to as a "zoom lens."

In one embodiment, terminal 10 is configured so that a setting of imaging lens assembly 40 can be switched between a plurality of lens settings. In one embodiment, the plurality of lens settings is three lens settings.

Various lens settings of imaging lens assembly 40, in one embodiment, are illustrated with reference to FIGS. 1, 2, and 3. In setting (a), a short range setting, terminal 10 has a best focus distance of 2" and a half FOV angle of 35°. With lens 40 set to setting (b), a medium (intermediate) range setting, terminal 10 has a best focus distance of 7" and a half FOV angle of 36.9°. With lens 40 set to setting (c), a long range setting, terminal 10 has a best focus distance of 24" and a half FOV angle of 11.5°. A focal length of imaging lens assembly 40 can be unchanged relative to setting (a) and setting (b). Between setting (a) and setting (b), a focal length of lens assembly 40 can be maintained at a constant value by maintaining a constant spacing between lens elements. Between setting (a) and setting (b) in a specific embodiment, a focal length of lens assembly 40 can be maintained at a constant value by maintaining a constant spacing between lens groupings where the groupings are moved farther from an image sensor array between setting (a) and setting (b). By maintaining focal length at a constant value the FOV angle of lens assembly 40 will not change substantially provided the image plane distance is significantly larger than the lens focal length. Distance and angular measurements herein are given as approximate measurements. A summary of possible lens settings in one embodiment is summarized in Table 1.

TABLE 1

| Range | Lens Setting | Focal Length | Half FOV Angle | Best Focus Distance |
|---|---|---|---|---|
| Short | (a) | 4.7 mm | 35° | 2" |
| Intermediate | (b) | 4.7 mm | 36.9° | 7" |
| Long | (c) | 17.3 mm | 11.5° | 24" |

Regarding lens setting (c), it is advantageous for terminal 10 to have a reduced FOV angle at a long range setting so that a resolution of image data representing a target indicia is improved. Terminal 10 can be adapted so that when terminal 10 operates to capture frames of image data for subjecting to decoding, terminal 10 cycles between three lens settings. Terminal 10 can cycle between lens settings such that for a certain exposure period, the lens setting is at a first lens setting; for a subsequent exposure period, the lens setting is at a second lens setting, and for a further subsequent exposure period, the lens setting is at a third lens setting, and continuing with the cycling so that during an exposure period after the further subsequent exposure period, the lens returns to a first or previous lens setting and so on. Frames that are captured corresponding to and representing light incident on an image sensor array during the certain, subsequent, and further subsequent exposure periods can be subject to an indicia decoding attempt such as a bar code decoding attempt.

In an alternative embodiment as shown in Table 2, imaging lens assembly 40 can have at least three lens settings. In each of the lens settings summarized in Table 2, imaging lens assembly 40 has a different focal length, a different half FOV angle, and a different best focus distance.

TABLE 2

| Range | Lens Setting | Focal Length | Half FOV Angle | Best Focus Distance |
|---|---|---|---|---|
| Short | (a) | 4.7 mm | 35° | 2" |
| Intermediate | (b) | 8 mm | 23.4° | 7" |
| Long | (c) | 17.3 mm | 11.5° | 24" |

A multiple setting lens assembly for use with terminal 10 can be conveniently provided by employing a motor for moving lens elements relative to an image plane and/or relative to one another. It will be understood, however, that a multiple setting imaging lens can be provided utilizing alternative technologies. For example, spring-based actuators can be employed for moving lens elements to an image plane and/or each other. Also, fluid lens technologies can be employed. Fluid lens technologies can be employed for purposes of adjusting a curvature of a lens assembly lens element. Fluid lens technologies can also be employed in order to change an index of refraction of a lens assembly lens element by way of applying energy to the lens element to vary an optical property of a liquid included in the lens element.

Figure 4:
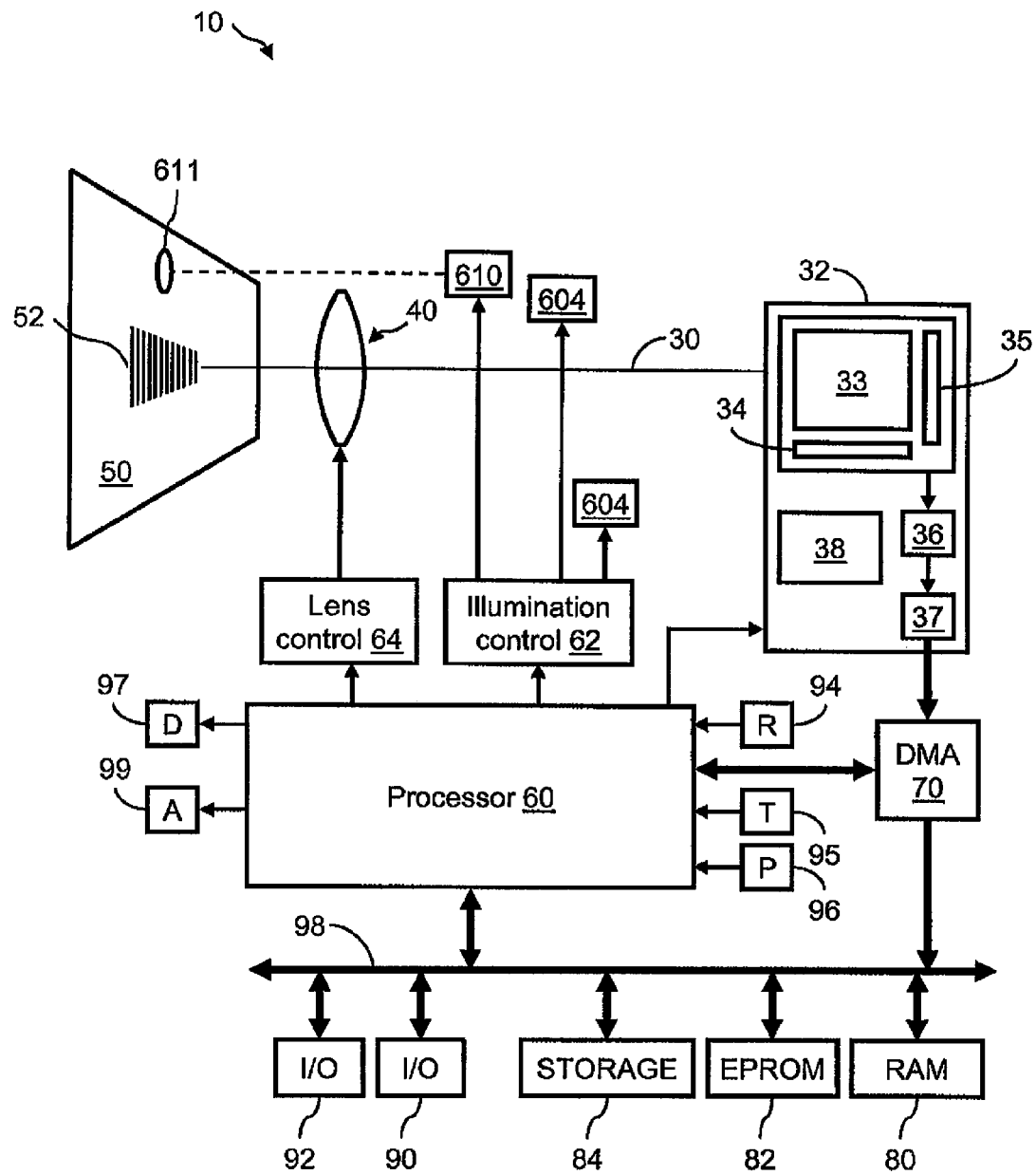
FIG. 4 is an exemplary block diagram illustrating an exemplary component of an indicia reading terminal in one embodiment.

A block diagram of an electrical component circuit diagram supporting operations of terminal 10 is shown in FIG. 4. Image sensor 32 can be provided on an integrated circuit having an image sensor pixel array 33 (image sensor array), column circuitry 34, row circuitry 35, a gain block 36, an analog-to-digital converter 37, and a timing and control block 38. Image sensor array 33 can be a two dimensional image sensor array having a plurality of light sensitive pixels formed in a plurality of rows and columns. Terminal 10 can further include a processor 60, an illumination control circuit 62, a lens control circuit 64, an imaging lens assembly 40, a direct memory access (DMA) unit 70, a volatile system memory 80 (e.g., a RAM), a nonvolatile system memory 82 (e.g., EPROM), a storage memory 84, a wireline input/output interface 90 (e.g., Ethernet), and an RF transceiver interface 92 (e.g., IEEE 802.11). Regarding illumination control circuit 62, illumination control circuit 62 can receive illumination control signals from processor 60 and can responsively deliver power to one or more illumination light sources such as light sources 604, and one or more aiming light sources such as aiming light source 610. Terminal 10 can also include a keyboard 94, a trigger button 95, and a pointer controller 96 for input of data and for initiation of various controls and a display 97 for output of information to an operator. Terminal 10 can also include a system bus 98 providing communication between processor 60 and various components of terminal 10. DMA unit 70 can be provided by, e.g., a field programmable gate array (FPGA) or an application specific integrated circuit (ASIC). While shown as being separate units, DMA unit 70 and processor 60 can be provided on a common integrated circuit. In a further aspect, terminal 10 can include multiple image sensors and can include a plurality of light source banks. The light source banks can be controlled according to various control methods that can vary depending on which of a plurality of available operating configurations are active. An example of terminals that can include a plurality of image sensors and which can include plural light source banks that can be controlled in accordance with a variety of different settings depending on which of a plurality of different candidate configurations is active are described in U.S. patent application Ser. No. 12/132,462 entitled, "Indicia Reading Terminal Processing Plurality of Frames of Image Data Responsively To Trigger Signal Activation," filed concurrently herewith and incorporated herein by reference.

In response to control signals received from processor 60, timing and control circuit 38 can send image sensor array timing signals to array 33 such as reset, exposure control, and readout timing signals. After an exposure period, a frame of image data can be read out. Analog image signals that are read out of array 33 can be amplified by gain block 36 converted into digital form by analog-to-digital converter 37 and sent to DMA unit 70. DMA unit 70, in turn, can transfer digitized image data into volatile memory 80. Processor 60 can address frames of image data retained in volatile memory 80 for decoding of decodable indicia represented therein.

Figure 5:
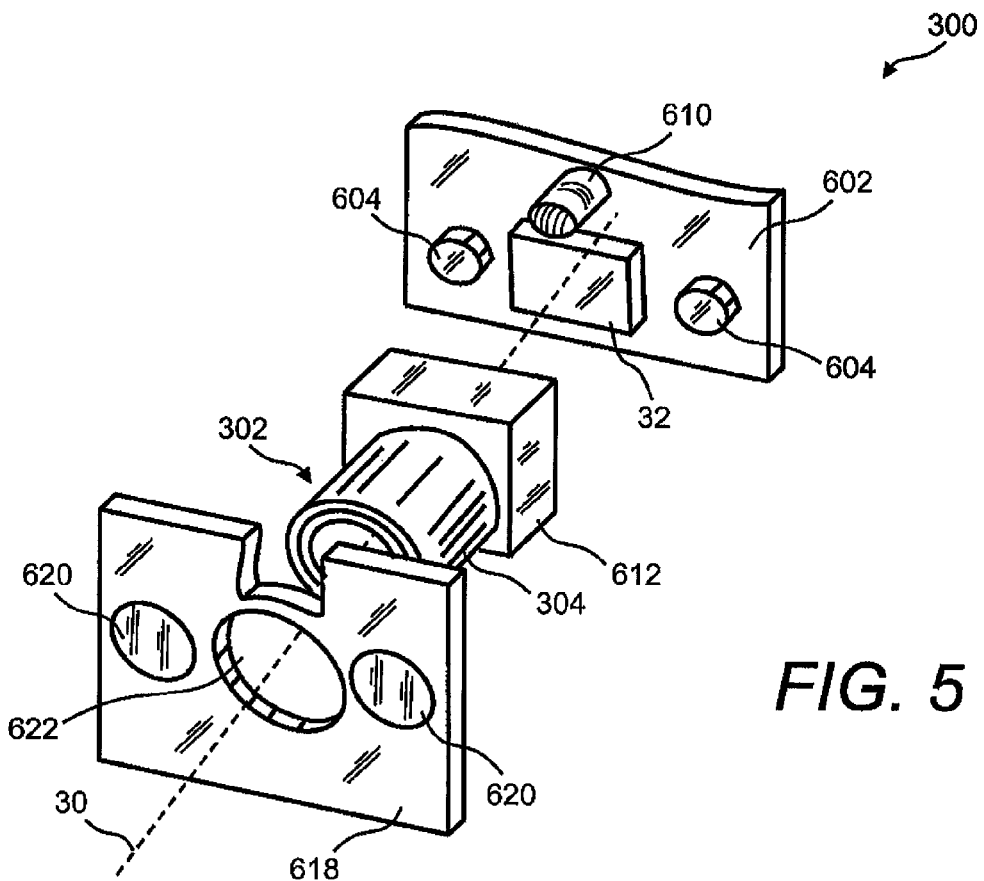
FIG. 5 is an exploded perspective assembly view of an imaging module in one embodiment.
Figure 6:
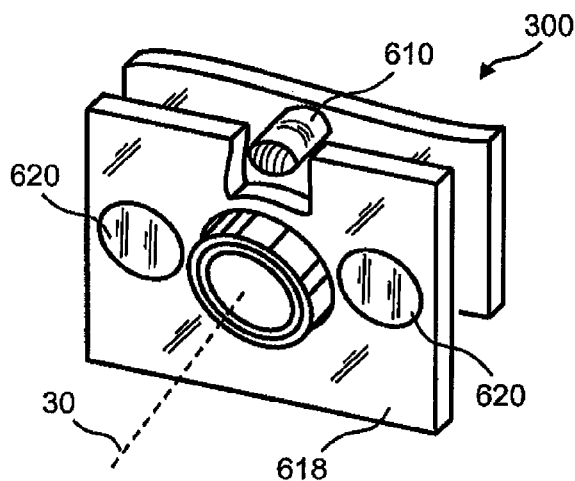
FIG. 6 is a perspective view of an assembled imaging module in one embodiment.

Referring to FIGS. 5 and 6, an imaging module for supporting various components of terminal 10 is described. Mounted on first circuit board 602 can be image sensor 32, illumination light sources 604 (e.g., LEDs), and aiming light source 610 which can be provided by a laser diode assembly. A shroud 612 can be disposed forwardly of image sensor 32, and disposed forwardly of shroud 612 can be a lens moving assembly 302, which in the embodiment of FIG. 5 can be provided by a hollow stepper motor assembly having more than one hollow stepper motor. An optical plate 618 having diffusers 620 for diffusing light from illumination light sources 604 can be disposed over lens moving assembly 302 so that hole 622 fits over outer barrel 304 as will be described in greater detail herein. An imaging module in an assembled form is shown in FIG. 6.

Figure 7:
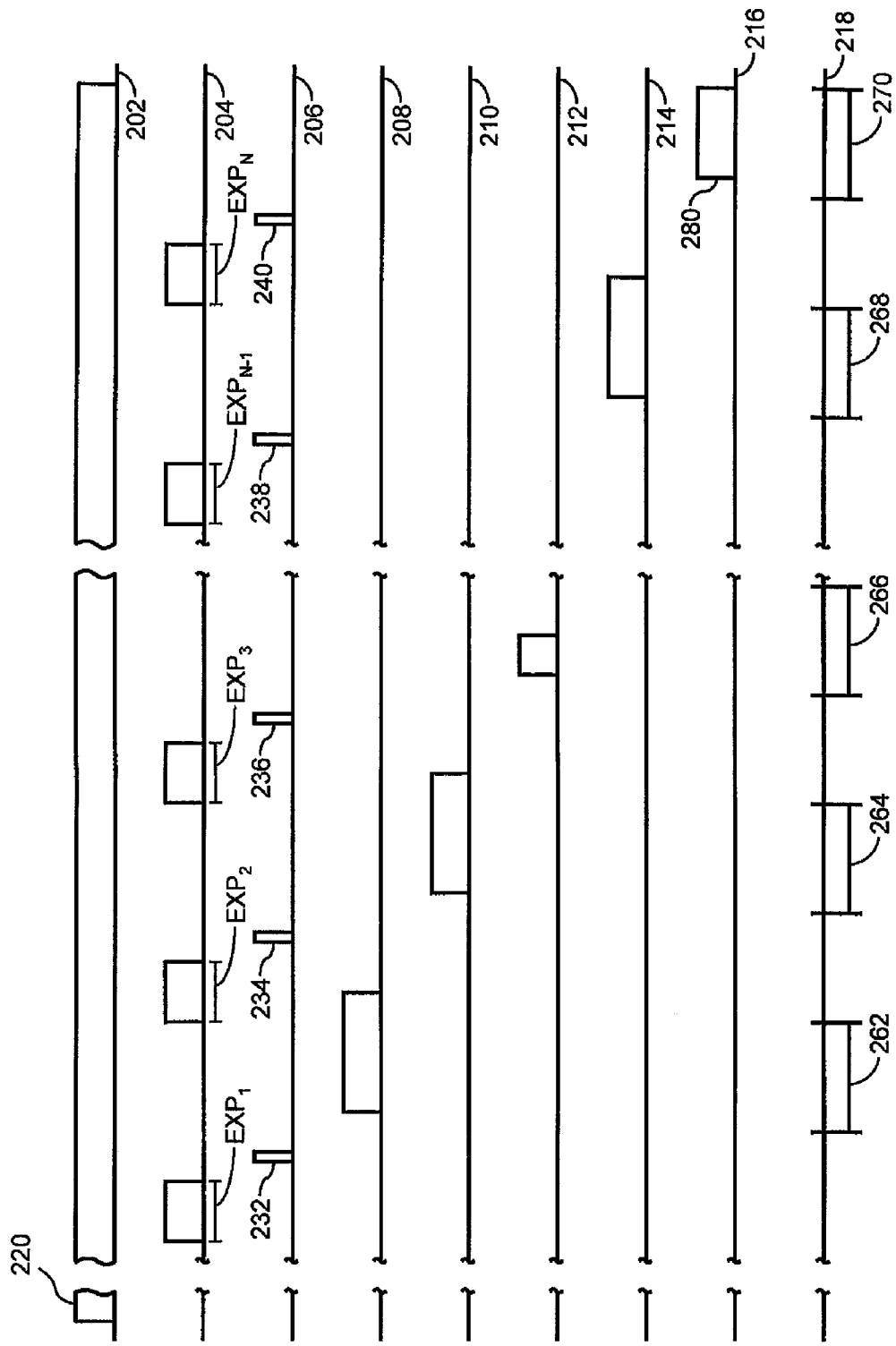
FIG. 7 is a timing diagram illustrating operation of an indicia reading terminal in one embodiment.

A timing diagram further illustrating operation of terminal 10, in one embodiment, is shown in FIG. 7. Timeline 202 shows a state of a trigger signal which may be made active by depression of trigger button 95. Terminal 10 can also be adapted so that a trigger signal can be made active by the terminal sensing that an object has been moved into a field of view thereof or by receipt of a serial command from an external computer. Terminal 10 can also be adapted so that a trigger signal is made active by a power up of terminal 10. For example, in one embodiment, terminal 10 can be supported on a scan stand and used for presentation reading. In such an embodiment, terminal 10 can be adapted so that a trigger signal represented by timeline 202 can be active for the entire time terminal 10 is powered up. With further reference to the timing diagram of FIG. 7, terminal 10 can be adapted so that after a trigger signal is made active at time 220, pixels of image sensor 32 are exposed during first exposure period $EXP_1$ occurring during a first time period followed by second exposure period $EXP_2$ occurring during a second time period, third exposure period $EXP_3$ occurring during a third time period and so on (after time 220 and prior to first exposure period $EXP_1$, parameter determination frames subject to parameter determination processing may be optionally captured subsequent to parameter determination exposure periods not indicated in FIG. 7). Referring to the timing diagram of FIG. 7, terminal 10 may expose, capture and subject to unsuccessful decode attempts N−1 frames of image data prior to successfully decoding a frame of image data corresponding to exposure period $EXP_N$. An exposure control signal in one embodiment is represented by timeline 204 of FIG. 7.

Terminal 10 can be adapted so that after pixels of image sensor array 33 are exposed during an exposure period, a readout control pulse is applied to array 33 to read out analog voltages from image sensor 32 representative of light incident on each pixel of a set of pixels of array 33 during the preceding exposure period. Timeline 206 illustrates a timing of readout control pulses applied to image sensor array 33. A readout control pulse can be applied to image sensor array 33 after each exposure period $EXP_1$, $EXP_2$, $EXP_3$, $EXP_{N-1}$, $EXP_N$. Readout control pulse 232 can be applied for reading out a frame of image data exposed during first exposure period $EXP_1$. Readout control pulse 234 can be applied for reading out a first frame of image data exposed during second exposure period $EXP_2$, and readout pulse 236 can be applied for reading out a frame of image data exposed during third exposure period, $EXP_3$. A readout control pulse 238 can be applied for reading out a frame of image data exposed during exposure period $EXP_{N-1}$ and readout control pulse 240 can be applied for reading out a frame of image data exposed during exposure period $EXP_N$.

Terminal 10 can be adapted so that making active trigger signal 202 drives terminal 10 into an active reading state. After analog voltages corresponding to pixels of image sensor array 33 are read out and digitized by analog-to-digital converter 37, digitized pixel values corresponding to the voltages can be received (captured) into system volatile memory 80. Terminal 10 can be adapted so that processor 60 can subject to a decode attempt a frame of image data retained in memory 80. For example, in attempting to decode a 1D bar code symbol represented in a frame of image data, processor 60 can execute the following processes. First, processor 60 can launch a scan line in a frame of image data, e.g., at a center of a frame, or a coordinate location determined to include a decodable indicia representation. Next, processor 60 can perform a second derivative edge detection to detect edges. After completing edge detection, processor 60 can determine data indicating widths between edges. Processor 60 can then search for start/stop character element sequences, and if found, derive element sequence characters character by character by comparing with a character set table. For certain symbologies, processor 60 can also perform a checksum computation. If processor 60 successfully determines all characters between a start/stop character sequence and successfully calculates a checksum (if applicable), processor 60 can output a decoded message. When outputting a decoded message, processor 60 can one or more of (a) initiate transfer of the decoded message to an external device, (b) initiate display of a decoded message on a display of terminal 10, (c) attach a flag to a buffered decoded message determined by processor 60, and (d) write the decoded message to an address on long term memory, e.g., 82 and/or 84. At the time of outputting a decoded message, processor 60 can send a signal to an acoustic output device of terminal 10 (not shown) to emit a beep.

Still referring to the timing diagram of FIG. 7, timeline 208 indicates the time at which processor 60 attempts to decode a first frame of image data corresponding to exposure period $EXP_1$ (i.e., the frame of image data having image data representing light incident on pixels of image sensor array 33 during first exposure period $EXP_1$). It is seen that processor 60 may commence attempting to decode using a first frame of image data a time after readout control pulse 232 to account for time delay in image data being captured into memory 80. Referring to timeline 210, timeline 210 indicates the time at which processor 60 attempts to decode a second frame of image data corresponding to and representing light incident on image sensor array 33 during second exposure period $EXP_2$. It is seen that processor 60 may commence attempting to decode using a second frame of image data a time after readout control pulse 234 to account for time delay in image data being captured into memory 80. Referring to timeline 212, timeline 212 indicates the time at which processor 60 attempts to decode a third frame of image data corresponding to and representing light incident on image sensor array 33 during third exposure period $EXP_3$. It is seen that processor 60 may commence attempting to decode using a third frame of image data a time after readout control pulse 236 to account for time delay in image data being captured into memory 80. Referring to timeline 214, timeline 214 indicates the time at which processor 60 attempts to decode an N−1$^{th}$ frame of image data corresponding to exposure period $EXP_{N-1}$. It is seen that processor 60 may commence attempting to decode using the N−1$^{th}$ frame of image data a time after readout control pulse 238 to account for a time delay in image data being captured into memory 80. Referring to timeline 216, timeline 216 indicates the time at which processor 60 attempts to decode an N$^{th}$ frame of image data corresponding to exposure period $EXP_N$. It is seen that processor 60 may commence attempting to decode using the N$^{th}$ frame of image data a time after readout control pulse 240 to account for time delay in image data being captured into memory 80.

In one embodiment, imaging lens assembly 40 can comprise moving lens elements which can be in a static (non-moving) state during exposure periods and in a moving state intermediate of exposure periods. Referring to timeline 218, timeline 218 indicates static period and moving (in motion) periods of a lens. Terminal 10 can be adapted so that during exposure periods $EXP_1$, $EXP_2$, $EXP_3$, $EXP_{N-1}$, and $EXP_N$ lens elements are maintained in a static state and intermediate of exposure periods $EXP_1$, $EXP_2$, $EXP_3$, $EXP_{N-1}$, and $EXP_N$ lens elements are in motion. Terminal 10 can be adapted so that lens control circuit 64 initiates control signals to move a lens element at about the time of initiation of readout control signal 232, 234, 236, 238, 240 and further so that lens elements responsively move in response to receipt of the timing signals during motion periods 262, 264, 266, 268, 270 as indicated in timeline 218. In the example of the timing diagram of FIG. 7, it is seen that processor 60 attempts to decode for bar code symbols represented in a frame of image data during motion periods of imaging lens assembly 40. Terminal 10 can be adapted so that lens elements of imaging lens assembly 40 are in motion while processor 60 attempts to decode a bar code symbol represented in a frame of image data.

Figure 8:
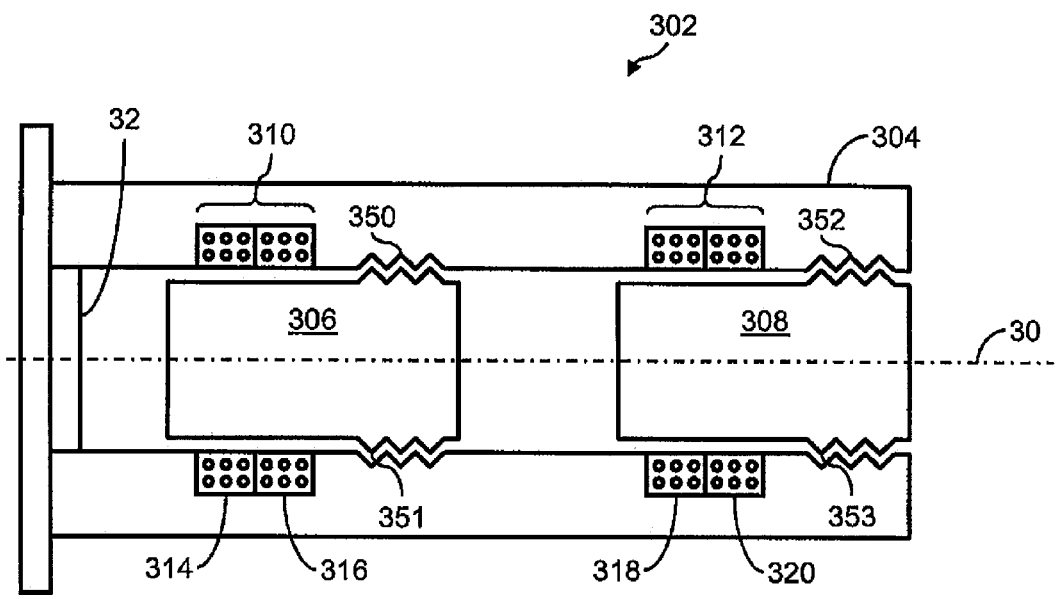
FIG. 8 is a cutaway side view of a lens movement assembly in one embodiment.
Figure 9:
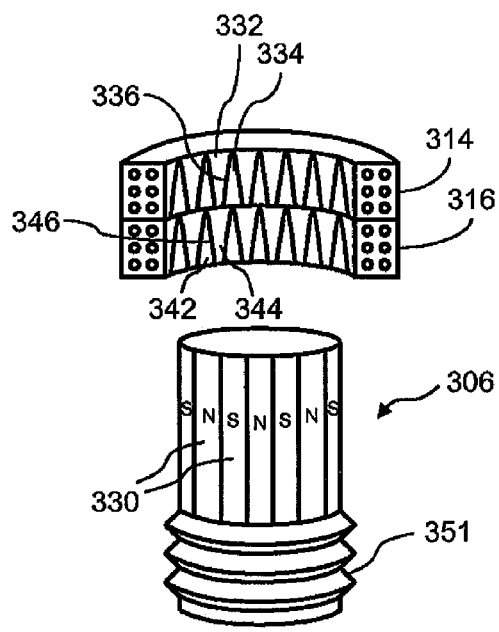
FIG. 9 is a perspective view of a hollow stepper motor in one embodiment.

Referring to FIGS. 8 and 9, a lens moving assembly 302 is described. A lens moving assembly 302 can comprise one or more hollow stepper motors. A hollow stepper motor, in one embodiment, generally is characterized by a permanent magnet equipped inner barrel, forming the rotor portion of the motor. A hollow stepper motor, in one embodiment, can further be characterized by a coil equipped outer barrel, supporting the inner barrel. Hollow stepper motors exhibit reduced size relative to other types of motors and allow for precision adjustment of lens element positions. In one embodiment an inner barrel portion of a hollow stepper motor can include threads that are threadably received in threads of an outer barrel. With such a thread arrangement, the motor can sustain high impact relative to gear based motor arrangements. In one embodiment, threads for receiving an inner barrel in relation to an outer barrel can include threads complementarily configured so that an inner barrel is maintained at a position with respect to outer barrel 304 by way of frictional forces and without application of external energy. Accordingly, a lens setting can be controlled to remain at a certain setting simply by avoiding supplying current to a lens driver coil. By comparison, alternative lens moving assemblies, while desirable in some instances, require applied power for maintaining a fixed lens setting. For example, motion systems including spring loaded lens moving mechanisms such as voice coil motors and helimorph piezo actuators require power for maintaining of a certain lens setting. Accordingly, a major advantage of a hollow stepper motor, in one embodiment is reduced power consumption. In the embodiment of FIGS. 8 and 9, lens moving assembly 302 comprises the lens elements of imaging lens assembly 40 as shown in the particular embodiment of FIGS. 1, 2, and 3, stationary outer barrel 304, first inner barrel 306, and second inner barrel 308. In the embodiment of FIG. 8, imaging axis 30 extends perpendicularly through image sensor 32 and through a plane of each lens element.

Regarding outer barrel 304, outer barrel 304 can comprise a first set of coils 310 corresponding to first inner barrel 306 and a second set of coils 312 corresponding to second inner barrel 308. First set of coils 310 includes first coil 314 and second coil 316. Second set of coils 312 likewise can comprise first coil 318 and second coil 320. The combination of first inner barrel 306 and the first set of coils 310 form a first hollow stepper motor while the combination of second inner barrel 308 and a second set of coils 312 form a second hollow stepper motor.

Further regarding lens moving assembly 302, outer barrel 304 includes first teeth 350 for engaging teeth 351 of first inner barrel 306 and second teeth 352 for engaging teeth 353 of second inner barrel 308. The combination of teeth 350 and teeth 351 provide movement of first inner barrel 306 along axis 30 when the first inner barrel 306 is caused to rotate. The combination of teeth 352 and teeth 353 provide movement of second inner barrel 308 along axis 30 when second inner barrel 308 is caused to rotate.

Operation of an exemplary hollow stepper motor is further described with reference to FIG. 9. Each of first and second inner barrels 306 and 308 can be provided as shown in FIG. 9. While the description of FIG. 9 relates to inner barrel 306 and coil set 310, it is understood that the description is also applicable to the hollow stepper motor comprising barrel 308 and second coil set 312. Inner barrel 306 can have permanent magnets 330 of alternating north and south polarity, which are alternately formed about the circumference of barrel 306. First coil 314 can have alternating teeth 332, 334 defined by gap 336. When current flows through coil 314 in a forward direction, magnetic fields of opposite polarity are formed at successively adjacent teeth, e.g., teeth 332, 334 of coil 314. When current flows through coil 314 in a backward direction, magnetic fields of opposite polarity are again formed at successively adjacent teeth of coil 314, except the polarity of the magnetic field is the opposite of its polarity during forward direction current flow. Similarly, second coil 316 can have alternating teeth 342, 344 defined by gap 346. When current flows through coil 316 in a forward direction, magnetic fields of opposite polarity are formed at successively adjacent teeth. When current flows through coil 316 in a backward direction, magnetic fields of opposite polarity are again formed at successively adjacent teeth of coil 316, except the polarity of the magnetic field is the opposite of its polarity during forward direction current flow.

For rotating inner barrel 306, current can be applied in forward and backward direction in first and second coil 314, 316 in a timed sequence coordinated manner to urge inner barrel 306 in a desired direction until a desired position of barrel 306 is achieved. When teeth of coil 314 or coil 316 have a certain polarity, it is seen that barrel 306 will have a certain position relative to barrel 304 such that permanent magnets thereof are aligned with teeth of coil 314 or coil 316. Thus, using the lens moving system of FIG. 8, precise positioning of lens elements can be achieved. The motor described with reference to FIG. 9 is referred to as a hollow stepper motor since discrete stepwise positions of barrel 306 relative to barrel 304 can be achieved wherein permanent magnets of the barrel are aligned with coil teeth having a certain polarity. Accordingly, with one of one or more hollow stepper motors, a lens setting of imaging lens assembly 40 can be a lens setting corresponding to certain positions of imaging lens assembly lens elements.

Still referring to the lens moving assembly of FIG. 8 and the specific exemplary imaging lens assembly 40 shown in FIGS. 1, 2, and 3, a first group of lens elements 420 can be disposed in first lens barrel 306 and a second group of lens elements 430 can be disposed in second lens barrel 308. By application of movement controlling control signals to first coil set 310 and second coil set 312 contemporaneously, imaging lens assembly 40 can be moved relative to the image plane defined by image sensor 32 without altering the relative positions of the lens elements of imaging lens assembly 40. Such movement is desirable in the case where it is desired to change a best focus position of imaging lens assembly 40 without changing a focal length of imaging lens assembly 40. By application of movement controlling control signals to only one of the first or second coil sets at a given time, relative movement between first group 420 and second group 430 can be achieved. Such movement is desirable in the case it is desired to change a best focus distance and a focal length of imaging lens assembly 40.

A major advantage of a hollow stepper motor configuration is reduced size. The size of lens moving assembly 40 can be reduced further utilizing one or more of the further miniaturized configurations as are described with reference to FIGS. 10-12.

Figure 10:
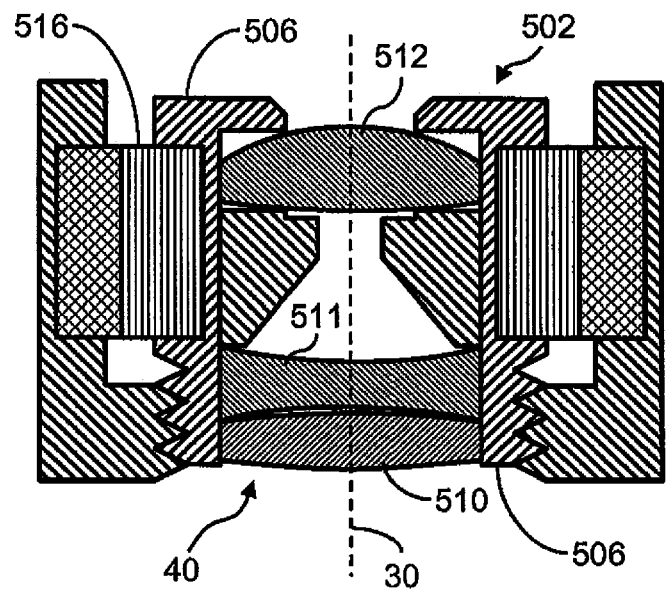
FIG. 10 is a cutaway side view illustrating a non-zooming imaging lens assembly which can be incorporated in an indicia reading terminal.

In FIG. 10, there is described a non-zooming imaging lens assembly 40 having an associated hollow stepper motor lens moving assembly. Inner barrel 502 in the embodiment of FIG. 10 has a substantially uniformly diametered support 506 for receiving lens elements 510, 511, 512. As indicated in the view of FIG. 10, magnets 516 can be disposed at the outer surface of support 506. While the uniform diametered arrangement of support 506 might yield a reduction in manufacturing complexity and costs, further miniaturization can be achieved with use of the design as shown in FIG. 11.

Figure 11:
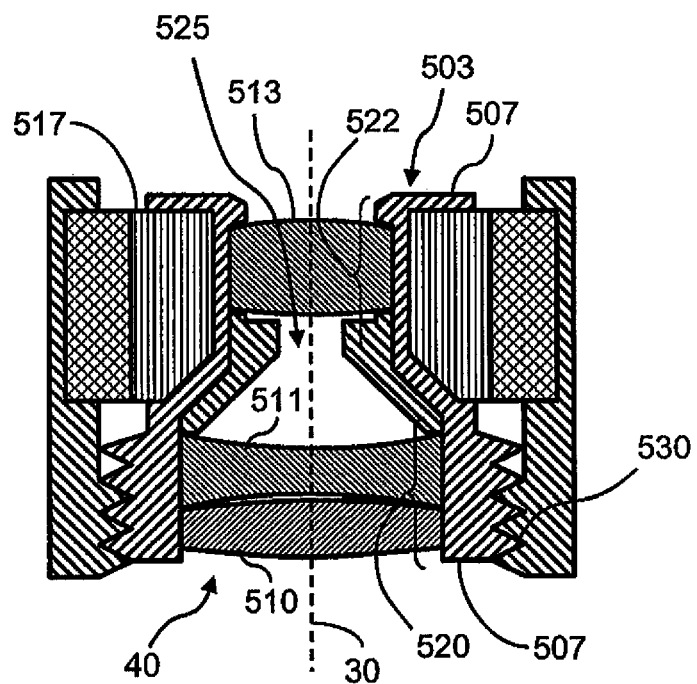
FIG. 11 is a cutaway side view illustrating another non-zooming imaging lens assembly which can be incorporated in an indicia reading terminal.

In the embodiment of FIG. 11, support 507 for receiving lens elements 510, 511, 513 is not uniformly diametered; but rather, includes a wider diametered region 520 and a smaller diametered region 522. Where imaging lens assembly 40 includes an aperture 525, the multiple diametered support 507 can be provided without any change in the performance of imaging lens assembly 40 by providing aperture 525 in the narrow diametered region 522 of support 520 as shown in FIG. 11. With further reference to the embodiment of FIG. 11, threads 530 can be disposed at the outer surface of the wider diametered region 520 of support 507, lens elements 510, 511 can be disposed in wider diametered region 520 and lens element 513 can be disposed in narrow diametered region 522.

With still further reference to the embodiment of FIG. 11 having a multiple diametered support 507, magnets 517 can be disposed at the outer surface of support 507 in the narrow diameter region of support 507 including lens aperture 525. Comparing FIGS. 10 and 11, it is seen that while the embodiment of FIG. 10 and FIG. 11 include identical optical characteristics, the embodiment of FIG. 11 can be of reduced diameter. Specifically, where magnets 517 are disposed about support 507 at narrow diameter region 522, wherein aperture 525 is defined, the maximum diameter of inner barrel 503 (equal to the support outer diameter plus 2× the thickness of the magnets) about aperture 525 is reduced relative to the maximum inner barrel diameter about aperture 525 in the embodiment as shown in FIG. 10.

Figure 12:
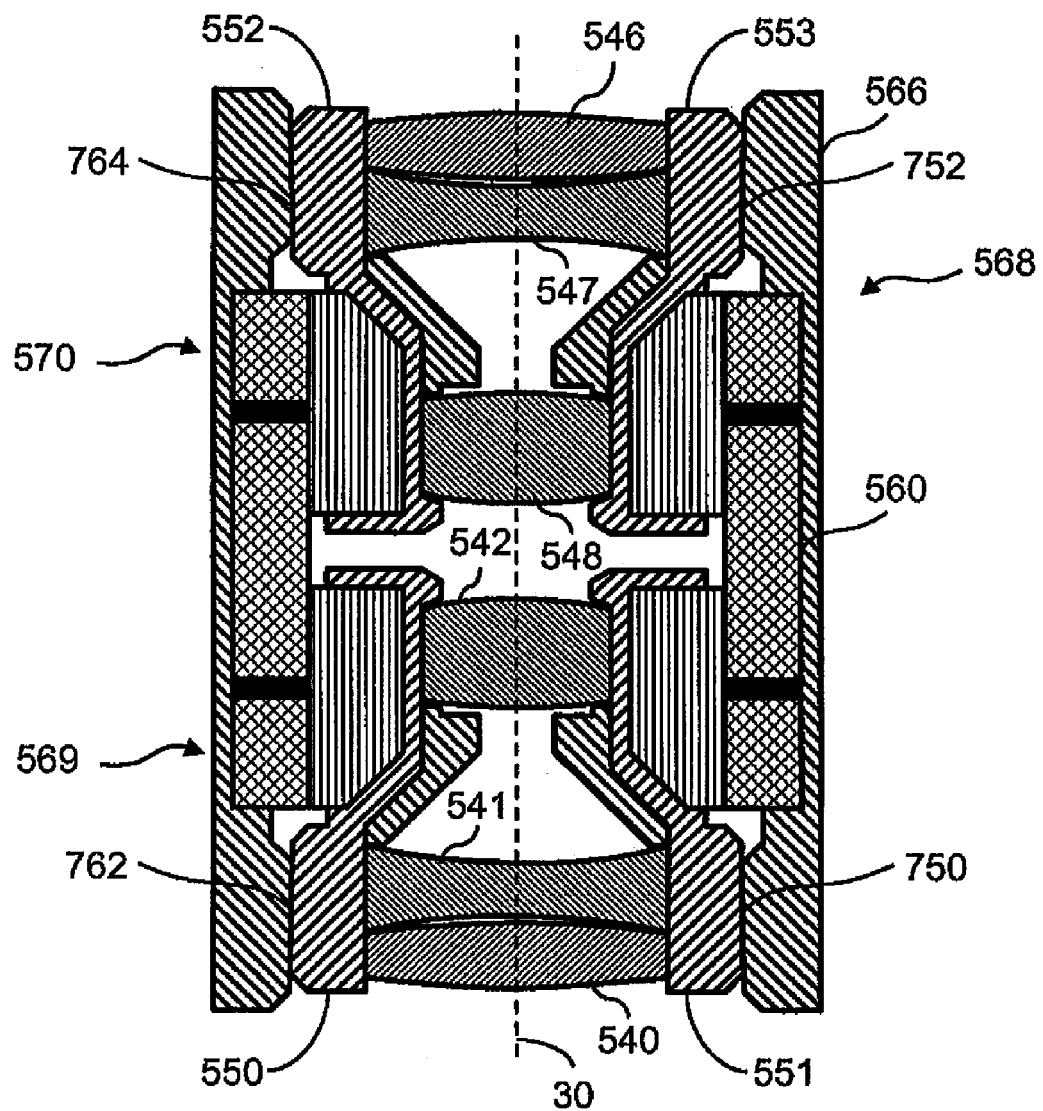
FIG. 12 is a cutaway side view illustrating a zooming imaging lens assembly which can be incorporated in an indicia reading terminal.

Another embodiment of a hollow stepper motor that can be used in a bar code reading terminal is shown in FIG. 12. In the embodiment of FIG. 12 showing a zoom imaging lens assembly having first group 540, 541, 542 and a second group 546, 547, 548 of lens elements, a first group of lens elements 540, 541, 542 is disposed in first inner barrel 550 and a second group of lenses 546, 547, 548 is disposed in second inner barrel 552. Each of first and second barrels 550, 552 in the embodiment of FIG. 12 have multiple diameter supports 551, 553, respectively as described in connection with the embodiment of FIG. 11. Further regarding the embodiment of FIG. 12, first inner barrel 550 and second inner barrel 552 can be driven by electromagnetic energy radiating from shared coil 560 disposed on outer barrel 566. With respect to first inner barrel 550, shared coil 560 can perform a function as provided by coil 316 as described relative to the embodiment of FIG. 8. With respect to second inner barrel 308, shared coil 560 can perform a function as provided by coil 318 as described in the embodiment of FIG. 8. By combining a function of a plurality of coils into a single shared coil 560, a size of hollow stepper motor lens moving assembly 568 is reduced. Also, with a reduction of a coil, a control input is eliminated simplifying control of the hollow stepper motor lens moving assembly 568. The embodiment of FIG. 12 can be regarded as a lens moving assembly having first and second hollow stepper motors 569, 570 wherein the hollow stepper motors share a common coil.

In another aspect, a system of camming surfaces can be formed complementarily on inner barrels 550, 552 and outer barrel 566, respectively. In one embodiment, camming surfaces 750, 752 can be formed on an outer surface of inner barrels 550, 552, and complementary camming surfaces 762, 764 can be formed on an inner surface of outer barrel 566. Such camming surfaces can be provided so that barrels 550, 552 move a desired distance in a direction co-extensive with imaging axis 30 when a barrel 550, 552 is rotated about axis 30. Camming surfaces between a barrel 550, 552 and outer barrel 566 can be irregular so that a first time a barrel, e.g., barrel 550 is rotated an angle, α degrees, about axis 30, the barrel moves x mm along axis 30 and further so that a second time barrel 550 is moved α degrees about axis 30, the barrel moves y mm along axis 30, x≠y. In one embodiment a camming surface of an inner barrel 550, 552 comprise a camming pin and a camming surface of outer barrel 566 comprises a camming groove.

Terminal components illustrated in FIG. 4 can be disposed within and supported by a hand held housing. An exemplary hand held housing 11 for incorporating and supporting terminal components is shown and described in FIG. 13 and FIG. 14. As seen in FIG. 14, a plurality of circuit boards 402 can be supported by housing 11 by way of struts 404 extending from interior walls of housing 11. An imaging module 300 which comprises a lens moving assembly 302 having imaging axis 30 and image sensor 32 can be disposed within housing 11 and can be supported by housing 11 by way of support 406 extending from an interior wall of housing 11.

Further aspects of terminal 10 are now described. Terminal 10 can be adapted so that when a trigger signal represented by timeline 202 (FIG. 7) is active terminal 10 continually subjects newly captured frames of image data to decoding attempts until decoding is successful. Terminal 10 can be adapted so that when terminal 10 successfully decodes an encoded message from a frame of image data (at time 280 shown in the timing diagram of FIG. 7), terminal 10 automatically deactivates trigger signal represented by timeline 202, stops the application of exposure control pulses to image sensor array 33, stops the application of readout control signals to image sensor array 33 and stops subjecting newly captured frames of image data to decode attempts. Where terminal 10 is a presentation reader, terminal 10 may be adapted to continually capture frames and subject such frames to a decode attempt after a first message is decoded. In addition to the above, terminal 10 after successfully decoding a message by processing a frame of image data can send a signal to an acoustic output device 99 to emit a good read beep, and can output a decoded message (e.g., by writing the decoded message to a specified memory address designated for retaining decoded messages, by writing the decoded message to display 97 and/or by sending the decoded message to an external computer). It has been mentioned that trigger signal represented by timeline 202 can be deactivated when there is a successful decode of a frame of image data. Terminal 10 can also be adapted so that trigger signal represented by timeline 202 is deactivated when a user releases a trigger button 95.

Terminal 10 after trigger signal represented by timeline 202 is made active may subject several frames of image data to unsuccessful decode attempts before successfully decoding a message from a frame of image data. In the specific example of FIG. 7, terminal 10 after trigger signal represented by timeline 202 is made active makes N−1 unsuccessful decode attempts by processing of frames 1 through N−1, until terminal 10 successfully decodes an encoded message by processing of frame N (the frame having image data representing light incident on pixel array pixels during exposure period $EXP_N$). It is understood that under one different illumination or decodable indicia quality condition, terminal 10 might successfully decode a first frame of image data subject to a decode attempt without unsuccessfully decoding any frames of image data. Under another different illumination or decodable indicia quality condition terminal 10 may successfully decode an Mth frame of image data after unsuccessfully decoding M−1 frames of image data, where M>>N.

Referring to the timing diagram of FIG. 7, a specific cycling pattern for cycling imaging lens assembly 40 between various lens settings is shown. In the specific example of FIG. 7, terminal 10 intermediate every successive exposure period, changes a setting of imaging lens assembly 40. In changing an imaging lens assembly setting where imaging lens assembly 40 includes multiple lens elements the changing of a lens setting can include movement of one or more lens elements along imaging axis 30. The lens setting cycling pattern shown in FIG. 7 has the characteristics of Configuration 1 as shown in Table A, below.

TABLE A

| Configuration | | Exposure Period and Lens Setting Coordination | | | | | | | | | | | |
|---|---|---|---|---|---|---|---|---|---|---|---|---|---|
| 1 | Exposure Period | 1 | 2 | 3 | 4 | 5 | 6 | 7 | 8 | 9 | 10 | 11 | 12 ... |
|   | Lens Setting | a | b | c | b | a | b | c | b | a | b | c | b ... |
| 2 | Exposure Period | 1 | 2 | 3 | 4 | 5 | 6 | 7 | 8 | 9 | 10 | 11 | 12 ... |
|   | Lens Setting | a | b | c | a | b | c | a | b | c | a | b | c ... |
| 3 | Exposure Period | 1 | 2 | 3 | 4 | 5 | 6 | 7 | 8 | 9 | 10 | 11 | 12 ... |
|   | Lens Setting | a | a | b | b | c | c | b | b | a | a | b | b ... |
| 4 | Exposure Period | 1 | 2 | 3 | 4 | 5 | 6 | 7 | 8 | 9 | 10 | 11 | 12 ... |
|   | Lens Setting | a | a | a | a | a | a | a | a | a | a | a | a ... |
| 5 | Exposure Period | 1 | 2 | 3 | 4 | 5 | 6 | 7 | 8 | 9 | 10 | 11 | 12 ... |
|   | Lens Setting | c | c | c | c | c | c | c | c | c | c | c | c ... |
| 6 | Exposure Period | 1 | 2 | 3 | 4 | 5 | 6 | 7 | 8 | 9 | 10 | 11 | 12 ... |
|   | Lens Setting | a | a' | b | b' | c | b' | b | a' | a | a' | b | b' ... |
| 7 | Exposure Period | 1 | 2 | 3 | 4 | 5 | 6 | 7 | 8 | 9 | 10 | 11 | 12 ... |
|   | Lens Setting | a | a | a | b | a | a | a | b | a | a | a | b ... |
| 8 | Exposure Period | 1 | 2 | 3 | 4 | 5 | 6 | 7 | 8 | 9 | 10 | 11 | 12 ... |
|   | Lens Setting | c | c | c | b | c | c | c | b | c | c | c | b ... |
| 9 | Exposure Period | 1 | 2 | 3 | — | — | — | — | — | — | — | — | — |
|   | Lens Setting | c | c | c | c | c | c | c | c | c | c | c | c | c |
| 10 | Exposure Period | 1 | 2 | 3 | 4 | 5 | 6 | 7 | 8 | 9 | 10 | 11 | 12 | 13 |
|   | Lens Setting | c | c | c | c | c | c | c | c | c | c | c | c | c |

Still referring to Table A, terminal 10 can have alternative exposure period and lens setting coordination characteristics. For example, in Configuration 2, terminal 10 can be controlled so that a lens setting of lens 40 cycles back to setting (a) after reaching setting (c) instead of returning to setting (b) as indicated by Configuration 1. In Configuration 1 and Configuration 2, terminal 10 establishes a new lens setting for lens 40 intermediate every successive exposure period. However, as indicated by Configuration 3, terminal 10 can control lens settings of imaging lens assembly 40 such that a lens setting of imaging lens assembly 40 remains at a constant setting for more than one successive exposure period (e.g., 2, 3, 5, N) successive exposure periods before a lens setting is changed. As indicated by Configurations 4 and 5, terminal 10 can be controlled so that terminal 10 maintains a setting of imaging lens assembly 40 at a constant setting and does not change a lens setting unless a different configuration is made active. In Configuration 4, terminal 10 is particularly well adapted to read decodable indicia at close range. In Configuration 5, terminal 10 is particularly well adapted to decode indicia at long range.

Imaging lens assembly 40 can have less than or more than three settings. As indicated by Configuration 6, imaging lens assembly 40 can have a setting (a') intermediate of setting (a) and (b), and a setting (b') intermediate of setting (b) and setting (b) and the additional settings (a') and (b') can be included in the cycle of settings.

A set of three subsequent exposure periods are referred to herein as a certain exposure period, a subsequent exposure period, and a further subsequent time period. For example, referring to the timing diagram of FIG. 7 and Table A, exposure periods $EXP_1$, $EXP_2$, $EXP_3$ are in "certain frame," "subsequent frame," and "further subsequent frame" relation. Exposure periods $EXP_3$, $EXP_4$, $EXP_5$ are also in "certain," "subsequent," and "further subsequent" relation as well as the exposure periods $EXP_1$, $EXP_4$, $EXP_5$ and the exposure periods $EXP_3$, $EXP_5$, $EXP_N$, etc. The convention employing the terms "certain," "subsequent," and "further subsequent" as described is also used to designate subsequent captured frames and subsequent decoding periods herein.

Figure 13:
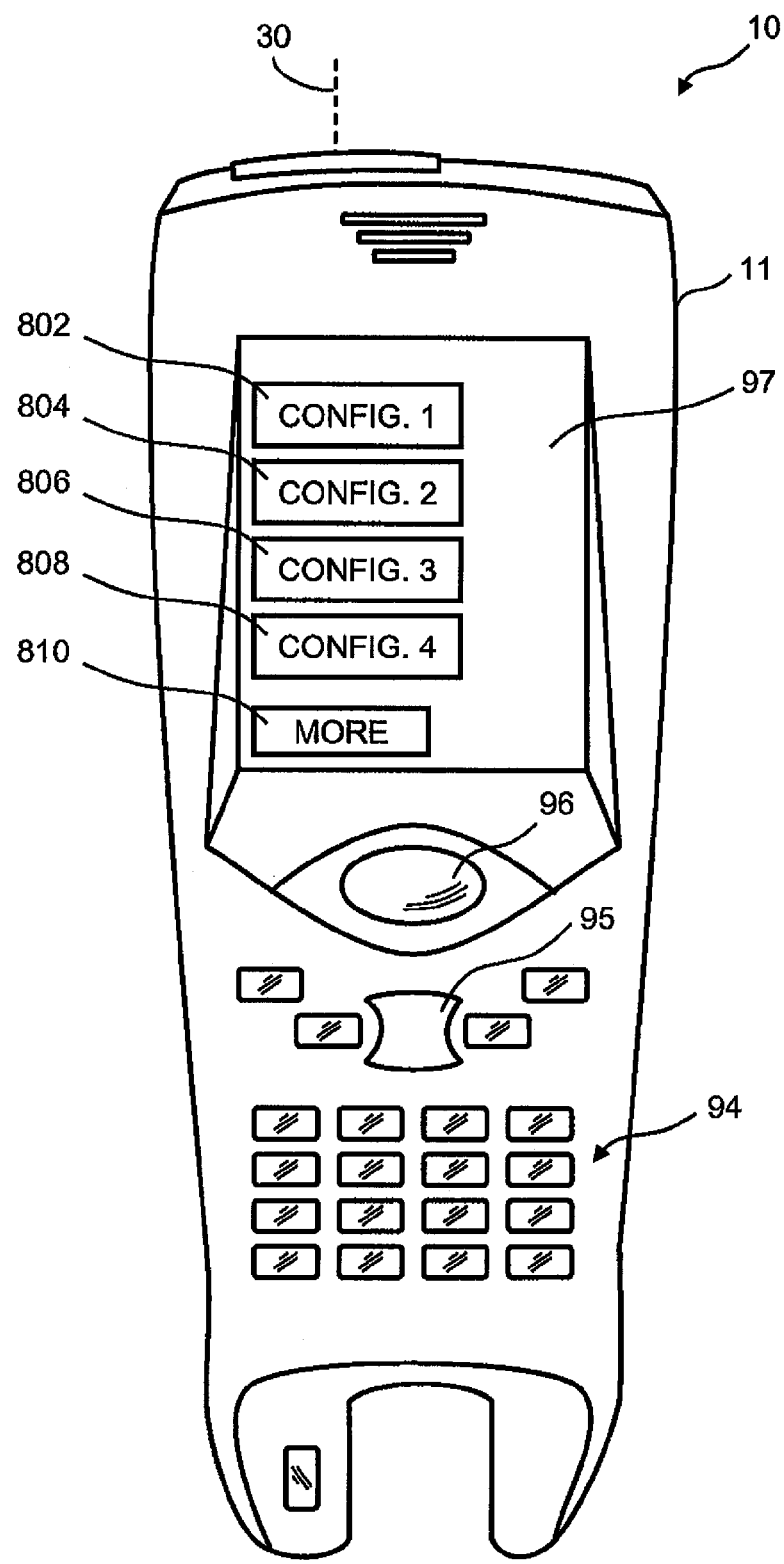
FIG. 13 is a perspective view of an indicia reading terminal incorporating a hand held housing in one embodiment.
Figure 14:
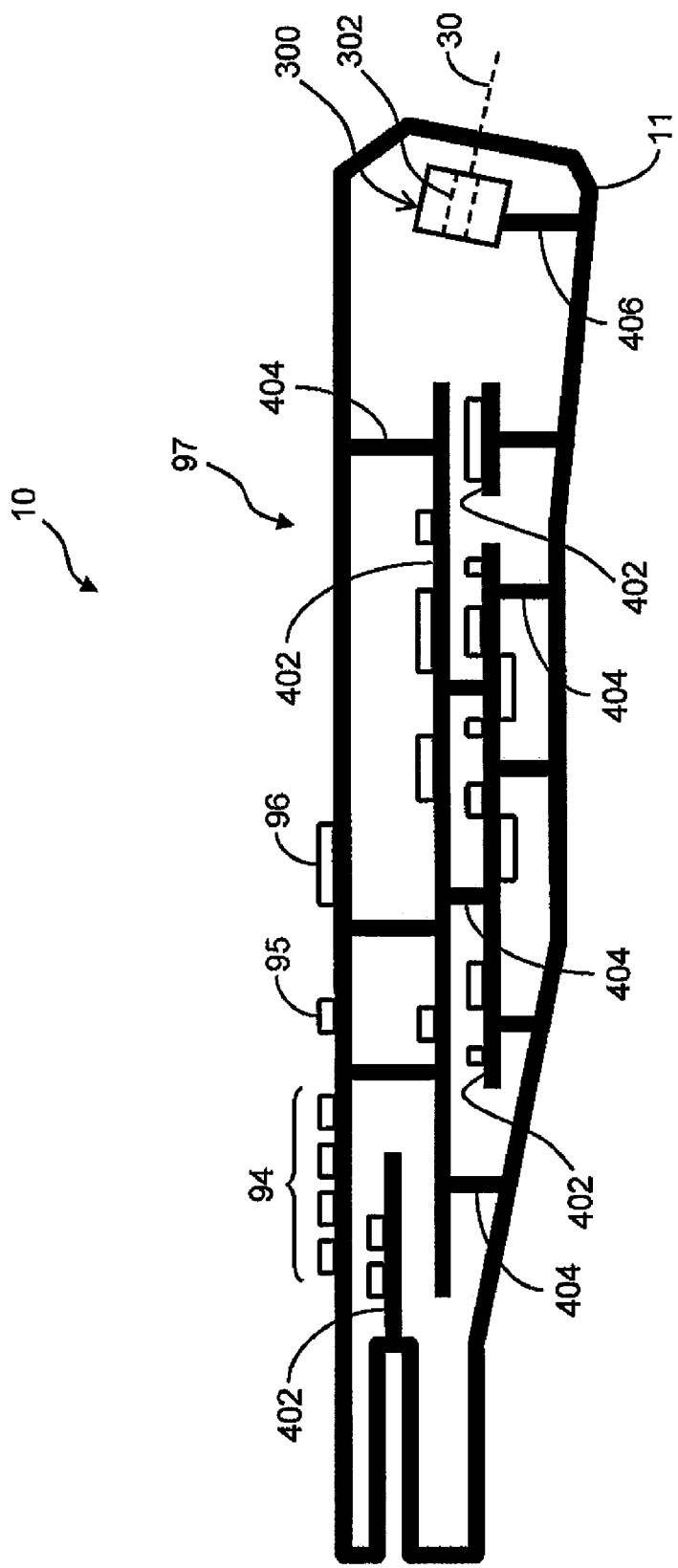
FIG. 14 is a cutaway side view of an indicia reading terminal as shown in FIG. 13.

As is shown in FIG. 13, terminal 10 can be adapted so that the Configurations of Table A and other configurations are user selectable. For example, in one embodiment a user interface of terminal 10 can include the presented menu as shown in FIG. 13 wherein terminal 10 displays buttons 802, 804, 806, 808 corresponding to each configuration option as shown in Table 1. Buttons for the remaining configurations can be accessed by actuating "more" button 810. When a user selects a particular button, terminal 10 is adapted to operate in accordance with the particular configuration selected until an operator selects another configuration.

In another embodiment, terminal 10 can be adapted to automatically cycle between one or more configurations described in Table A in response to failed decode attempts. For example, terminal 10 can be adapted so that after trigger signal represented by timeline 202 is made active and terminal 10 encounters X consecutive decode failures, (consecutive frames being subjected to a decode attempt without success) terminal 10 may automatically switch to another configuration without trigger signal represented by timeline 202 being deactivated. In another embodiment, terminal 10 can be adapted so that terminal 10 automatically cycles between Configurations of Table A between successive activations of trigger signal represented by timeline 202. For example, terminal 10 can be adapted so that when trigger signal 202 is initiated a first time, Configuration 1 is active and when initiated a second time after said first time, another configuration e.g., Configuration 2 is active.

In still another embodiment, terminal 10 can be adapted so that the imaging lens assembly cycling configuration is responsive to a sensed condition other than the sensed condition mentioned above, wherein the mentioned sensed condition is an inability to decode a decodable indicia (indicated by consecutive frames being subjected to a decode attempt without success consecutive decode failures). A sensed condition can be e.g., a sensed terminal to target distance in one example. In one embodiment, terminal 10 can be adapted to project a spot of light onto a target substrate 50 carrying a bar code symbol 52 (bar code). For example, terminal 10 can be adapted so that aiming light source 610 projects spot 611 onto target substrate 50. In such an embodiment, the terminal to target distance can be determined based on the location of the spot in a captured frame of image data provided the spot is projected at a known angle from terminal 10. In one example, terminal 10 may automatically activate Configuration 7 when a short range terminal to target distance is detected and can automatically activate Configuration 8 when a long range terminal to target distance is detected. In accordance with Configuration 7, terminal 10 primarily establishes the setting of imaging lens assembly 40 at setting (a) but occasionally establishes the lens setting at setting (b). In accordance with Configuration 8, terminal 10 primarily establishes the setting of imaging lens assembly 40 at setting (c) but occasionally moves the setting to setting (b) during a decode attempt. Terminal 10 can be adapted so that if terminal 10 is moved a distance away from a target during a decode attempt while terminal 10 captures and attempts to decode a succession of frames of image data, terminal 10 may automatically change a configuration thereof from Configuration 7 to Configuration 8 so that a lens setting cycling pattern changes during a decode attempt while a trigger signal remains active.

With further reference to the configurations of Table A, Configuration 9 is an exemplary still image picture taking configuration. Terminal 10 can be adapted so that in a still image picture taking configuration, terminal 10 may capture a limited number of frames, e.g., 1 to J frames responsively to a trigger signal being made active. In the specific embodiment, terminal 10 captures three frames responsively to a trigger signal being made active in the still image picture taking configuration, and averages the frames for noise reduction, prior to outputting a still image frame.

Configuration 10 illustrates an exemplary motion video collection configuration. Terminal 10 can be adapted so that responsively to a trigger signal being made active in a motion video collection configuration, terminal 10 captures a plurality of frames in succession, and formats the frames into a motion video file format for storage and later viewing and/or into a live streaming video format for live viewing.

It is seen with reference to Table A that when in a still image picture taking configuration or in a motion video configuration, a lens setting of imaging lens assembly 40 is set to setting (c) wherein the imaging lens assembly has a long range focus. When operating in Configuration 9 (still image picture taking) or Configuration 10 (motion video), terminal 10, in one embodiment, avoids subjecting captured frames of image data to decode attempts.

A small sample of the methods of an apparatus described herein are as follows.

A1. A bar code reading terminal comprising:
an image sensor having a plurality of pixels;
a multiple setting imaging lens assembly having a plurality of lens elements, the multiple setting imaging lens assembly having a plurality of lens settings;
a hand held housing, wherein said image sensor is disposed within said hand held housing;
wherein said lens settings of said imaging lens assembly includes at least first, second, and third lens settings;
wherein said terminal when said lens setting is at said first lens setting has a first best focus distance and a first focal length;
wherein said terminal when said lens setting is at said second lens setting has a second best focus distance different from said first best focus distance and a focal length unchanged relative to said first focal length;
wherein said terminal when said lens setting is at said third lens setting has a third best focus distance different from either of said first or second best focus distance and a focal length different from said first focal length; and
wherein said terminal is adapted so that when a trigger signal is active, said terminal automatically cycles a lens setting of said multiple setting imaging lens assembly between said first, second, and third lens settings;
wherein said terminal is further adapted so that when a trigger signal is active, said terminal captures a certain subsequent and a further subsequent frame of image data, and subjects each of the certain, subsequent and further subsequent frames of image data to a decode attempt, the first frame having image data representing light incident on pixels of said image sensor when said imaging lens assembly is at a first lens setting, the subsequent frame having image data representing light incident on pixels of said image sensor when said imaging lens assembly is at said second lens setting, the further subsequent frame having image data representing light incident on pixels of said image sensor when said imaging lens assembly is at said third lens setting.

A2. The bar code reading terminal of claim A1, wherein said image sensor is a 1D image sensor.

A3. The bar code reading terminal of claim A1, wherein said image sensor is a 2D image sensor.

A4. The bar code reading terminal of claim A1, wherein said bar code reading terminal includes a hollow stepper motor for facilitating motion of at least one lens element of said imaging lens assembly.

A5. The bar code reading terminal of claim A1, wherein said terminal in an active reading state cycles between said first, second, and third lens settings such that during a certain frame exposure period, said imaging lens assembly is set to said first lens setting, in a subsequent frame exposure period, said imaging lens assembly is set to a second lens setting, and further so that in a further subsequent frame exposure period occurring after said subsequent time period said imaging lens assembly is set to a third lens setting.

A6. The bar code reading terminal of claim A1, wherein said certain, subsequent, and further subsequent frames of image data are successively captured frames of image data.

A7. The bar code reading terminal of claim A1, wherein said terminal, has a plurality of groupings of lens elements, and wherein said terminal is adapted so that when cycling between said first and second lens setting, said terminal maintains a spacing between said groups while changing a distance between said plurality of groupings and said image sensor.

B1. A bar code reading terminal comprising:

an image sensor having a plurality of pixels;

a multiple setting imaging lens assembly for focusing an image of target bar code onto an active surface of said image sensor, the multiple setting imaging lens assembly having a plurality of lens elements;

a hand held housing, wherein said image sensor is disposed within said hand held housing;

at least one hollow stepper motor for moving at least one lens element of said multiple setting imaging lens assembly; and wherein said terminal is further adapted so that said terminal in an active reading state subjects each of said first and subsequent frames of image data to a decode attempt for attempting to decode said target bar code.

B2. The bar code reading terminal of claim B1 wherein said lens settings of said imaging lens assembly include at least first, second, and third lens settings, wherein said terminal when said lens setting is at said first lens setting has a first best focus distance and a first focal length, wherein said terminal when said lens setting is at said second lens setting has a second best focus distance different from said first best focus distance and a focal length constant relative to said first focal length, wherein said terminal when said lens setting is at said third lens setting has a third best focus distance different from either of said first or second best focus distance and a focal length different from said first focal length, and wherein said terminal is adapted so that in an active reading state said terminal automatically cycles a lens setting of said multiple setting imaging lens assembly between said first, second, and third lens settings.

B3. The bar code reading terminal of claim B1, wherein said subsequent exposure period is an exposure period succeeding said first exposure period.

C1. A bar code reading terminal comprising:

an image sensor having a plurality of pixels;

a multiple setting imaging lens assembly for focusing an image of target bar code onto an active surface of said image sensor, the multiple setting imaging lens assembly having a plurality of lens elements, the multiple setting imaging lens assembly having a plurality of lens settings;

a hand held housing, wherein said image sensor is disposed within said hand held housing;

wherein said terminal is adapted so that responsively to a trigger signal of said terminal being made active, said terminal captures at least a certain and subsequently a subsequent frame of image data, said certain frame of image data representing light incident on pixels of said image sensor during a certain exposure period, said subsequent frame of image data representing light incident on pixels of said image sensor during a subsequent exposure period occurring after said certain exposure period;

wherein said terminal is further adapted so that said imaging lens assembly has a first lens setting during said first exposure period and a second lens setting during said subsequent exposure period;

wherein said terminal is further adapted so that said terminal in an active reading state subjects each of said certain and subsequent frames of image data to a decode attempt for attempting to decode said target bar code, the terminal attempting to decode said certain frame of image data during a certain decoding period and attempting to decode said subsequent frame of image data during a subsequent decoding period;

wherein said imaging lens assembly is adapted so that said multiple lens settings of said multiple setting imaging lens are facilitated by movement of at least one lens element during a motion period of said imaging lens assembly; and wherein said terminal in an active reading state is adapted in such manner that at least one of said certain and subsequent decoding periods is coincident with a motion period of said imaging lens assembly so that said terminal in an active reading state moves at least one lens element of said imaging lens assembly to achieve a different lens setting while simultaneously processing image data to attempt to decode said target bar code.

C2. The bar code reading terminal of claim C1 wherein said lens settings of said imaging lens assembly include at least first, second, and third lens settings, wherein said terminal when said lens setting is at said first lens setting has a first best focus distance and a first focal length, wherein said terminal when said lens setting is at said second lens setting has a second best focus distance different from said first best focus distance and a focal length unchanged relative to said first focal length, wherein said terminal when said lens setting is at said third lens setting has a third best focus distance different from either of said first or second best focus distance and a focal length different from said first focal length, and wherein said terminal is adapted so that in an active reading state said terminal automatically cycles a lens setting of said multiple setting imaging lens assembly between said first, second, and third lens settings.

C3. The bar code reading terminal of claim C1, wherein said bar code reading terminal includes at least one hollow stepper motor for moving at least one lens element of said multiple setting imaging lens assembly.

C4. The bar code reading terminal of claim C1, wherein said terminal is adapted so that further responding to a trigger signal being made active, said terminal captures a further subsequent frame of image data, said terminal further being adapted so that said terminal in an active ready state subjects ends of said certain, subsequent and further subsequent frames of image data to a decode attempt.

D1. A bar code reading terminal comprising:

an image sensor comprising a plurality of pixels;

an imaging lens assembly comprising lens elements for focusing an image onto an active surface of said image sensor;

a lens moving assembly for moving lens elements of said imaging lens assembly, wherein said lens moving assembly includes at least one inner barrel and an outer barrel, the inner barrel including a support for supporting at least some of said lens elements, the support having a narrower diameter section defining an aperture and a wider diameter section, the inner barrel having permanent magnets being driven by electromagnetic energy radiating from at least one coil disposed at said outer coil, wherein said magnets of said inner coil are disposed about said inner section of said support;

wherein said bar code reading terminal is adapted to capture, responsively to a trigger signal being made active, a plurality of frames of image data representing light incident on said plurality of pixels; and wherein said bar code reading terminal is further adapted so that responsively to trigger signal being made active said terminal subjects said plurality of frames to a decode process for decoding a bar code symbol.

E1. A bar code reading terminal comprising:

an image sensor comprising a plurality of pixels;

an imaging lens assembly comprising lens elements for focusing an image onto an active surface of said image sensor;

a lens moving assembly for moving lens elements of said imaging lens assembly, wherein said lens moving assembly includes an outer barrel, a first inner barrel and a second inner barrel, wherein a first group of lens elements are disposed in said first inner barrel and a second group of lenses are disposed in said second inner barrel, the first and second inner barrels having magnets disposed about a circumference thereof, and wherein said outer barrel includes a common coil for radiating electromagnetic energy for simultaneously driving both of said first inner barrel and said second inner barrel;

wherein said bar code reading terminal is adapted to capture, responsively to a trigger signal being made active, a plurality of frames of image data representing light incident on said plurality of pixels; and wherein said bar code reading terminal is further adapted so that responsively to trigger signal being made active said terminal subjects said plurality of frames to a decode process for decoding a bar code symbol.

F1. A bar code reading terminal comprising:
an image sensor comprising a plurality of pixels;
an imaging lens assembly comprising lens elements for focusing an image onto an active surface of said image sensor;
an imaging axis extending perpendicularly through said imaging lens assembly;
a lens moving assembly for moving lens elements of said imaging lens assembly, wherein said lens moving assembly includes an outer barrel and an inner barrel, wherein camming surfaces are disposed on said outer barrel and said inner barrel, wherein permanent magnets are disposed about said inner barrel, and wherein said outer barrel includes at least one coil radiating electromagnetic energy for rotating said inner barrel about said axis, the camming surfaces guiding moving in a direction coextensive with said axis as said inner barrel is rotated about said axis;
wherein said bar code reading terminal is adapted to capture, responsively to a trigger signal being made active, a plurality of frames of image data representing light incident on said plurality of pixels; and
wherein said bar code reading terminal is further adapted so that responsively to trigger signal being made active said terminal subjects said plurality of frames to a decode process for decoding a bar code symbol.

F2. The bar code reading terminal of claim F1, wherein said camming surfaces are arranged so that a first time said inner barrel is rotated a certain number of radians about said axis, said inner barrel moves a distance of x mm aligning said axis and further so that a second time said inner barrel is rotated a certain number of degrees about said axis, said inner barrel moves a distance of y along said axis, where x≠y.

G1. A bar code reading terminal comprising:
an image sensor having a plurality of pixels;
a multiple setting imaging lens assembly having a plurality of lens elements, the multiple setting imaging lens assembly having a plurality of lens settings,
a hand held housing, wherein said image sensor is disposed within said hand held housing;
wherein said lens settings of said imaging lens assembly includes at least first, second, and third lens settings;
wherein said terminal when said lens setting is at said first lens setting has a first best focus distance and a first focal length;
wherein said terminal when said lens setting is at said second lens setting has a second best focus distance different from said first best focus distance and a second focal length different relative to said first focal length;
wherein said terminal when said lens setting is at said third lens setting has a third best focus distance different from either of said first or second best focus distance and a focal length different from said first and said second focal length;
wherein said terminal is adapted so that when a trigger signal is active, said terminal automatically cycles a lens setting of said multiple setting imaging lens assembly between said first, second, and third lens settings; and
wherein said terminal is adapted further so that when a trigger signal is active, said terminal captures a certain, subsequent and a further subsequent frame of image data, and subjects each of the first subsequent and further subsequent frames of image data to a decode attempt, the first frame having image data representing light incident on pixels of said image sensor when said imaging lens assembly is at first lens setting, the subsequent frame having image data representing light incident on pixels of said image sensor when said imaging lens assembly is at said second lens setting, the further subsequent frame having image data representing light incident on pixels of said image sensor when said imaging lens assembly is at said third lens setting.

G2. The bar code reading terminal of claim G1, wherein said image sensor is a 1D image sensor.

G3. The bar code reading terminal of claim G1, wherein said image sensor is a 2D image sensor.

G4. The bar code reading terminal of claim G1, wherein said bar code reading terminal includes a hollow stepper motor for facilitating motion of at least one lens element of said imaging lens assembly.

G5. The bar code reading terminal of claim G1, wherein said certain, subsequent, and further subsequent frames of image data are successively captured frames of image data.

G6. The bar code reading terminal of claim G1, wherein said terminal, has a plurality of groupings of lens elements, and wherein said terminal is adapted so that when cycling between said first and second lens setting, said terminal maintains a spacing between said groups while changing a distance between said plurality of groupings and said image sensor.

H1. A bar code reading terminal comprising:
an image sensor having a plurality of pixels;
a multiple setting imaging lens assembly having a plurality of lens settings;
a hand held housing, wherein said image sensor is disposed with said hand held housing;
wherein said bar code reading terminal is capable of operating according to a first configuration and a second configuration, wherein said terminal when said first configuration is active cycles between at least some of said plurality of lens settings when capturing frames of image data responsively to a trigger signal being made active;
wherein said terminal when said second configuration maintains a setting of said multiple setting lens assembly at a single setting when capturing at least one frame of image data responsively to a trigger, wherein said first configuration is a configuration in which said terminal is optimized for reading bar code symbols; and
wherein said second configuration is a configuration optimizing said terminal for one of still image picture taking or motion video collection, wherein said terminal has a user interface enabling operator selection of said first configuration and said second configuration.

I1. A bar code reading terminal comprising:
an image sensor having a plurality of pixels;
a multiple setting imaging lens assembly having a plurality of lens settings;
a hand held housing, wherein said image sensor is disposed within said hand held housing;
wherein said bar code reading terminal is capable of operating according to a first configuration and a second configuration;

wherein said terminal when said first configuration is active cycles between at least some of said plurality of lens settings according to a first cycling pattern when capturing frames of image data;

wherein said terminal when said second configuration is active cycles between at least some of said plurality of lens settings according to a second cycling pattern when capturing frames of image data;

wherein said terminal when said first configuration is active is optimizing for reading bar code symbols at a relatively shorter range; and wherein said terminal when said second configuration is active is optimized for reading bar code symbols at a relatively longer reading range.

I2. The bar code reading terminal of claim I1, wherein said terminal has a user interface enabling an operator to select between said first and second configurations.

I3. The bar code reading terminal of claim I1, wherein said terminal is adapted so that said terminal can switch between said first and second configurations responsively to a sensed condition while a trigger signal remains active.

I4. The bar code reading terminal of claim I1, wherein said terminal is adapted so that said terminal can switch between said first and second configurations responsively to a sensed condition while a trigger signal remains active, the sensed condition being a sensed distance of said terminal to a target.

I5. The bar code reading terminal of claim I1, wherein said terminal is adapted so that said terminal can switch between said first and second configurations responsively to a sensed condition while a trigger signal remains active, the sensed condition being an inability to decode an indicia.

J1. A bar code reading terminal comprising:
an image sensor having a plurality of pixels;
a multiple setting imaging lens assembly having a plurality of lens settings;
a hand held housing, wherein said image sensor is disposed within said hand held housing;
wherein said bar code reading terminal is capable of operating according to a first configuration and a second configuration;
wherein said terminal when said first configuration is active cycles between at least some of said plurality of lens settings according to a first cycling pattern when capturing frames of image data;
wherein said terminal when said second configuration is active maintains a setting of said multiple setting lens assembly at a fixed lens setting when capturing frames of image data; and
wherein said terminal is adapted so that said terminal can switch from one said first configuration and said second configuration to the other of said first and second configurations responsively to a sensed condition that is sensed while a trigger signal is active.

J2. The terminal of claim J1, wherein said sensed condition is a distance from said terminal to a target.

J3. The terminal of claim J1, wherein said sensed condition is an inability to decode an indicia.

K1. A bar code reading terminal comprising:
an image sensor having a plurality of pixels;
a multiple setting imaging lens assembly having a plurality of lens settings;
a hand held housing, wherein said image sensor is disposed within said hand held housing;
wherein said bar code reading terminal is capable of operating according to a first configuration and a second configuration;

wherein said terminal when said first configuration is active cycles between at least some of said plurality of lens settings according to a first cycling pattern when capturing frames of image data;

wherein said terminal when said second configuration is active cycles between at least some of said plurality of lens settings according to a second cycling pattern when capturing frames of image data, the second cycling pattern being different from said first cycling pattern; and wherein said terminal is adapted so that said terminal can switch from one said first configuration and said second configuration to the other of said first and second configurations responsively to a sensed condition that is sensed while a trigger signal is active.

K2. The terminal of claim K1, wherein said sensed condition is a distance from said terminal to a target.

K3. The terminal of claim K1, wherein said sensed condition is an inability to decode an indicia.

K4. The terminal of claim K1, wherein said multiple setting imaging lens assembly comprises a plurality of lens elements.

K5. The terminal of claim K1, wherein said multiple setting imaging lens assembly includes moving lens elements.

K6. The terminal of claim K1, wherein said multiple setting imaging lens assembly includes moving lens elements, and wherein movement of said moving lens elements is provided by a hollow stepper motor.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

We claim:
1. A bar code reading terminal comprising:
an image sensor having a plurality of pixels;
a multiple setting imaging lens assembly for focusing an image of target bar code onto an active surface of said image sensor, the multiple setting imaging lens assembly having a plurality of lens elements;
a hand held housing, wherein said image sensor is disposed within said hand held housing;
at least one hollow stepper motor for moving at least one lens element of said multiple setting imaging lens assembly; and
wherein said terminal is further adapted so that said terminal in an active reading state subjects each of a first and subsequent frame of image data to a decode attempt for attempting to decode said target bar code;
wherein said imaging lens assembly includes at least first, second, and third lens settings, wherein said terminal when said lens setting is at said first lens setting has a first best focus distance and a first focal length, wherein said terminal when said lens setting is at said second lens setting has a second best focus distance different from said first best focus distance and a focal length constant relative to said first focal length, wherein said terminal when said lens setting is at said third lens setting has a third best focus distance different from either of said first or second best focus distance and a focal length different from said first focal length, and wherein said terminal is adapted so that in an active reading state said terminal automatically cycles a lens setting of said multiple setting imaging lens assembly between said first, second, and third lens settings.

2. The bar code reading terminal of claim 1, wherein an exposure period in which the subsequent frame of image data is exposed is an exposure period succeeding an exposure period in which the first frame of image data is exposed.

3. The bar code reading terminal of claim 1, wherein the subsequent frame of image data succeeds the first frame of image data.

4. The bar code reading terminal of claim 1, wherein said multiple setting imaging lens assembly includes moving lens elements.

5. The bar code reading terminal of claim 1, wherein said multiple setting imaging lens assembly includes moving lens elements.

6. The bar code reading terminal of claim 1, wherein said multiple setting imaging lens assembly includes moving lens elements, and wherein movement of said moving lens elements is provided by a motor.

7. The bar code reading terminal of claim 1, wherein said multiple setting imaging lens assembly includes moving lens elements, and wherein movement of said moving lens elements is provided by a hollow stepping motor.

8. A bar code reading terminal comprising:
an image sensor comprising a plurality of pixels;
an imaging lens assembly comprising lens elements for focusing an image onto an active surface of said image sensor;
an imaging axis extending perpendicularly through said imaging lens assembly;
a lens moving assembly for moving lens elements of said imaging lens assembly, wherein said lens moving assembly includes an outer barrel and an inner barrel, wherein camming surfaces are disposed on said outer barrel and said inner barrel, wherein permanent magnets are disposed about said inner barrel, and wherein said outer barrel includes at least one coil radiating electromagnetic energy for rotating said inner barrel about said axis, the camming surfaces guiding moving in a direction coextensive with said axis as said inner barrel is rotated about said axis;
wherein said bar code reading terminal is adapted to capture, responsively to a trigger signal being made active, a plurality of frames of image data representing light incident on said plurality of pixels; and
wherein said bar code reading terminal is further adapted so that responsively to trigger signal being made active said terminal subjects said plurality of frames to a decode process for decoding a bar code symbol.

9. The bar code reading terminal of claim 8, wherein said camming surfaces are arranged so that a first time said inner barrel is rotated a certain number of radians about said axis, said inner barrel moves a distance of x mm aligning said axis and further so that a second time said inner barrel is rotated a certain number of degrees about said axis, said inner barrel moves a distance of y along said axis, where $x \neq y$.

10. The bar code reading terminal of claim 8, wherein said bar code reading terminal includes a hand held housing in which the image sensor is disposed.

11. A bar code reading terminal comprising:
an image sensor having a plurality of pixels;
a multiple setting imaging lens assembly having a plurality of lens settings;
a hand held housing, wherein said image sensor is disposed within said hand held housing;
wherein said bar code reading terminal is operative according to a first configuration and a second configuration;
wherein said terminal when said first configuration is active cycles between at least some of said plurality of lens settings according to a first cycling pattern when capturing frames of image data;
wherein said terminal when said second configuration is active cycles between at least some of said plurality of lens settings according to a second cycling pattern when capturing frames of image data;
wherein said terminal when said first configuration is active optimized for reading bar code symbols at a relatively shorter range; and
wherein said terminal when said second configuration is active is optimized for reading bar code symbols at a relatively longer reading range.

12. The bar code reading terminal of claim 11, wherein said terminal has a user interface enabling an operator to select between said first and second configurations.

13. The bar code reading terminal of claim 11, wherein said terminal is adapted so that said terminal can switch between said first and second configurations responsively to a sensed condition while a trigger signal remains active.

14. The bar code reading terminal of claim 11, wherein said terminal is adapted so that said terminal can switch between said first and second configurations responsively to a sensed condition while a trigger signal remains active, the sensed condition being a sensed distance of said terminal to a target.

15. The bar code reading terminal of claim 11, wherein said terminal is adapted so that said terminal can switch between said first and second configurations responsively to a sensed condition while a trigger signal remains active, the sensed condition being an inability to decode an indicia.

16. The bar code reading terminal of claim 11, wherein said multiple setting imaging lens assembly includes moving lens elements, and wherein movement of said moving lens elements is provided by a motor.

17. The bar code reading terminal of claim 11, wherein said multiple setting imaging lens assembly includes moving lens elements, and wherein movement of said moving lens elements is provided by a hollow stepping motor.

18. The bar code reading terminal of claim 17, wherein the bar code reading terminal includes a trigger button, and wherein the bar code reading terminal is configured so that the trigger signal is made active by depression of a trigger button.

19. The bar code reading terminal of claim 18, wherein the bar code reading terminal is operative to capture a plurality of frames of image data responsively to activation of a trigger signal.

20. The bar code reading terminal of claim 11, wherein said terminal is adapted so that said terminal can switch between said first and second configurations responsively to a sensed condition.

* * * * *